US008997250B2

(12) United States Patent
Ogura

(10) Patent No.: US 8,997,250 B2
(45) Date of Patent: Mar. 31, 2015

(54) IMAGE FORMING APPARATUS, EQUIPMENT SYSTEM, AND COMPUTER-READABLE STORAGE MEDIUM

(75) Inventor: Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 341 days.

(21) Appl. No.: 13/180,037

(22) Filed: Jul. 11, 2011

(65) Prior Publication Data

US 2012/0017286 A1 Jan. 19, 2012

(30) Foreign Application Priority Data

Jul. 16, 2010 (JP) ................................ 2010-161902

(51) Int. Cl.
G06F 21/00 (2013.01)
H04N 1/00 (2006.01)
(52) U.S. Cl.
CPC .... H04N 1/00222 (2013.01); *H04N 2201/3205* (2013.01); *H04N 2201/3235* (2013.01); *H04N 2201/3276* (2013.01)
USPC .......................................................... 726/28
(58) Field of Classification Search
None
See application file for complete search history.

(56) References Cited

U.S. PATENT DOCUMENTS

| 2001/0051887 | A1* | 12/2001 | Jeyachandran et al. ............ 705/8 |
| 2002/0107809 | A1* | 8/2002 | Biddle et al. ..................... 705/59 |
| 2003/0151620 | A1* | 8/2003 | Fujita et al. ................... 345/738 |
| 2003/0163712 | A1* | 8/2003 | LaMothe et al. ............... 713/189 |
| 2004/0122715 | A1* | 6/2004 | McAuliffe ........................ 705/2 |
| 2004/0225876 | A1* | 11/2004 | Lam ................................. 713/2 |
| 2006/0279778 | A1* | 12/2006 | Choi et al. .................... 358/1.15 |
| 2007/0245404 | A1* | 10/2007 | Okano ............................. 726/3 |

FOREIGN PATENT DOCUMENTS

JP 2008-047056 2/2008

* cited by examiner

*Primary Examiner* — David Le
(74) *Attorney, Agent, or Firm* — IPUSA, PLLC

(57) ABSTRACT

An image forming apparatus includes a login unit configured to receive a login of a user; a program storage unit; a function introduction unit configured to obtain a first program licensed to the user and license information of the first program, and to store the first program and the license information in the program storage unit without deleting a second program that is a different version of the first program from the program storage unit; a user information storage unit configured to store user information that registers license information of introduced programs and version information with user IDs; and a function providing unit configured to specify license information and version information that are associated with a user ID of a user who logs into the image forming apparatus in order to provide a function realized by a program corresponding to the license information and the version information to the user.

19 Claims, 31 Drawing Sheets

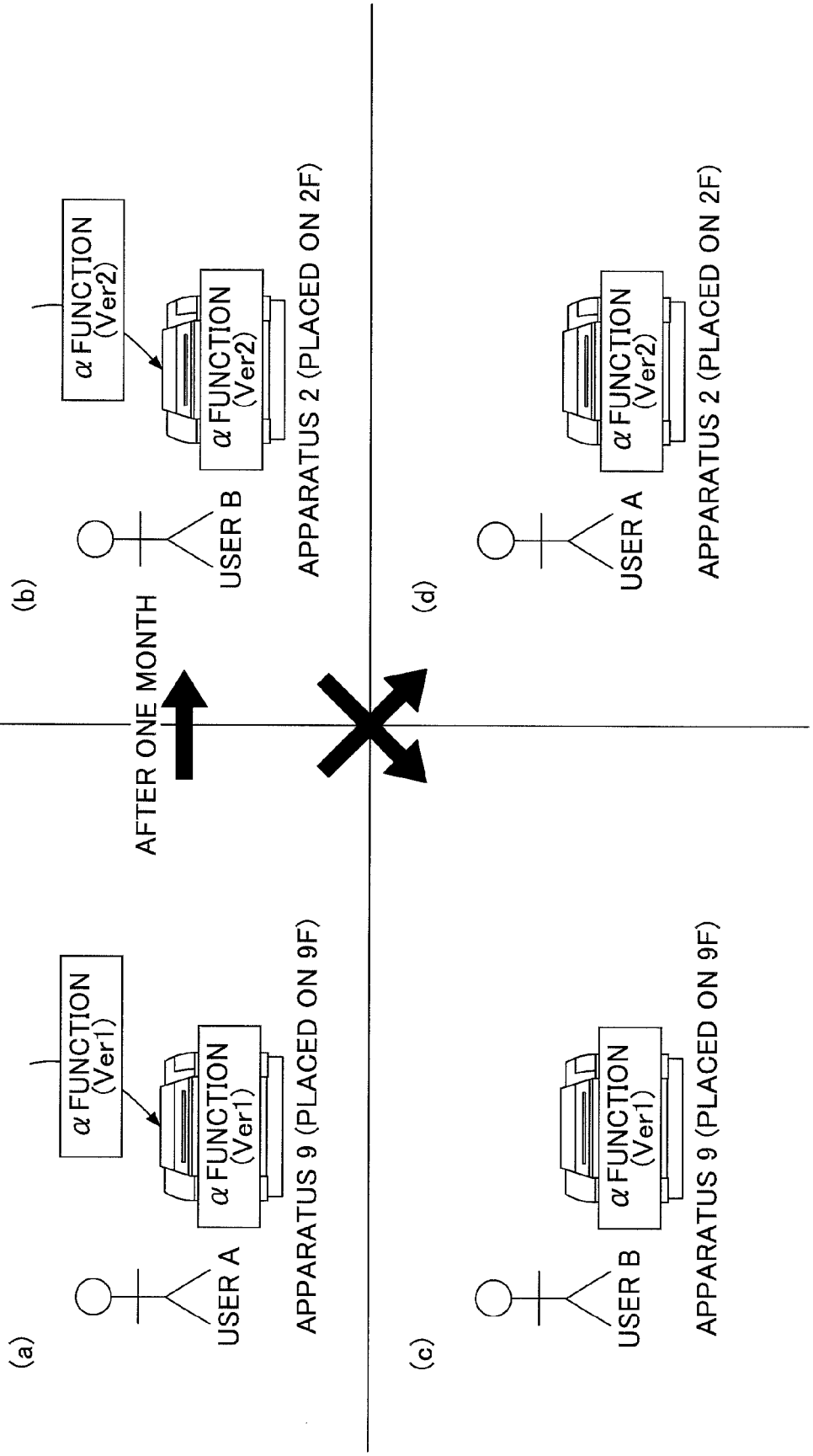

FIG.20A

| USER INFORMATION REGISTRATION | OK | CANCEL |

USER ID : aaaa

PURCHASED FUNCTION

α FUNCTION

SPECIFIABLE VERSION

- Ver1
- Ver2
- ALWAYS NEWEST
- NEWEST IN APPARATUS
- LAST LAUNCHED VERSION
- VERSION OF MANY USERS

FIG.20B

| DEFAULT SETTING SCREEN | OK | CANCEL |

DEFAULT SETTING COMMON TO FUNCTIONS

SPECIFIABLE VERSION

- Ver1
- Ver2
- ALWAYS NEWEST
- NEWEST IN APPARATUS
- LAST LAUNCHED VERSION
- VERSION OF MANY USERS

FIG.21

| FUNCTION | LICENSE FORM | VERSION | LAST LAUNCH TIME |
|---|---|---|---|
| α | —(DEFAULT) | 2 | 2010/01/01 |
| β | TIED LICENSE | 2 | 2010/05/01 |
| β | | 1 | 2010/01/01 |
| γ | TIED LICENSE | 3 | 2010/01/01 |
| γ | | 2 | 2010/02/01 |
| Σ | NORMAL LICENSE | 1 | 2010/03/01 |

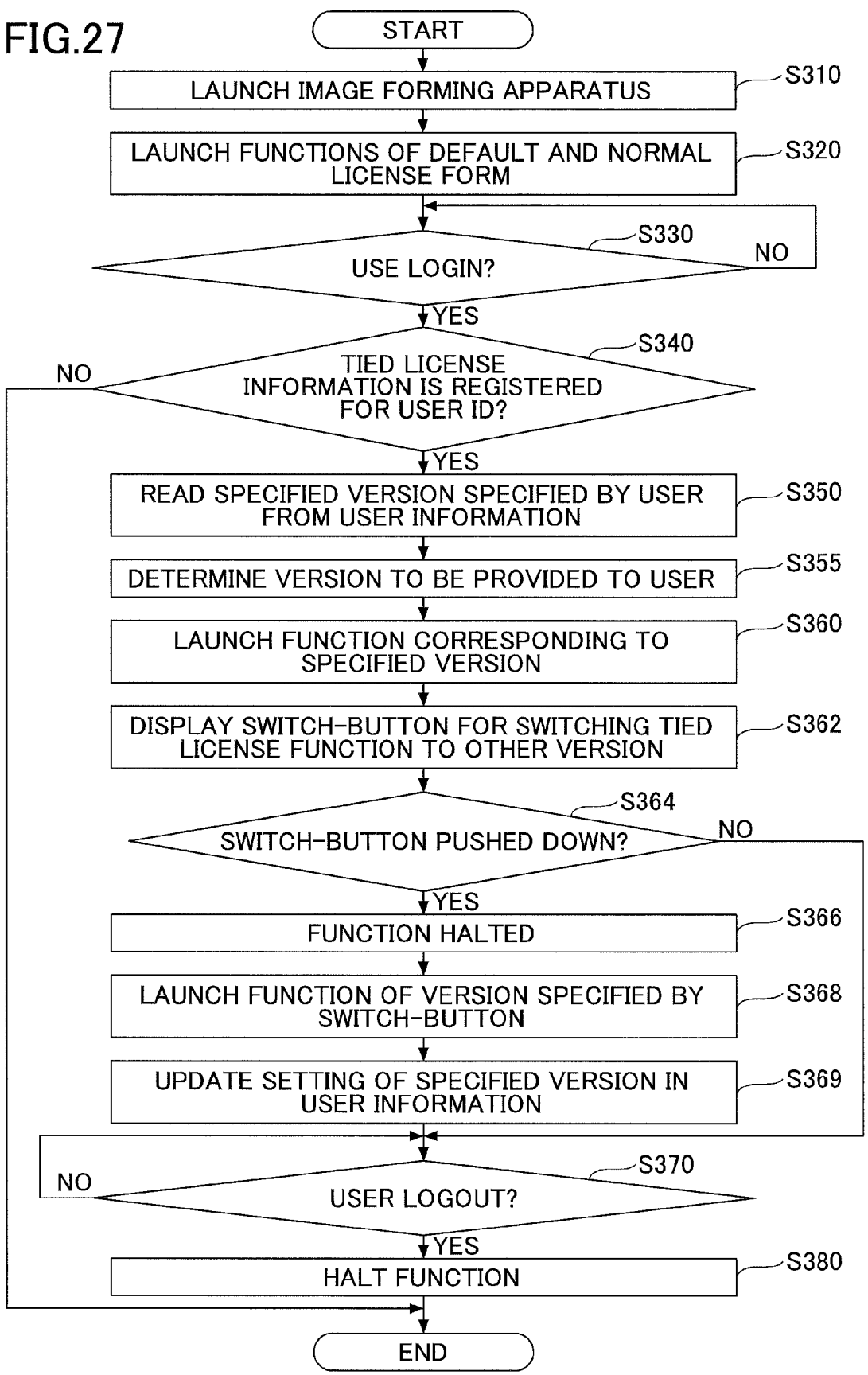

FIG.28A

| FUNCTION | LICENSE FORM | VERSION | LAST LAUNCH TIME | UPPER LIMIT NUMBER | INTRODUCTION DATE AND TIME | NUMBER OF TIMES OF USE IN THE PAST YEAR |
|---|---|---|---|---|---|---|
| α | — (DEFAULT) | 2 | 2010/01/01 | 12 AS A WHOLE | | |
| β | TIED LICENSE | 2 | 2010/05/01 | | 2010/05/01 | 10 |
| β | TIED LICENSE | 1 | 2010/01/01 | | 2009/05/01 | 5 |
| γ | TIED LICENSE | 3 | 2010/03/01 | | 2009/12/01 | 6 |
| γ | | 2 | 2010/02/01 | | 2010/01/01 | 1 |
| Σ | NORMAL LICENSE | 1 | 2010/03/01 | | | |

FIG.28B

| FUNCTION | LICENSE FORM | VERSION | LAST LAUNCH TIME | UPPER LIMIT NUMBER | INTRODUCTION DATE AND TIME | NUMBER OF TIMES OF USE IN THE PAST YEAR |
|---|---|---|---|---|---|---|
| α | — (DEFAULT) | 2 | 2010/01/01 | | | |
| β | TIED LICENSE | 2 | 2010/05/01 | 3 | 2010/05/01 | 10 |
| β | TIED LICENSE | 1 | 2010/01/01 | | 2009/05/01 | 5 |
| γ | TIED LICENSE | 3 | 2010/03/01 | 4 | 2009/12/01 | 6 |
| γ | | 2 | 2010/02/01 | | 2010/01/01 | 1 |
| Σ | NORMAL LICENSE | 1 | 2010/03/01 | | | |

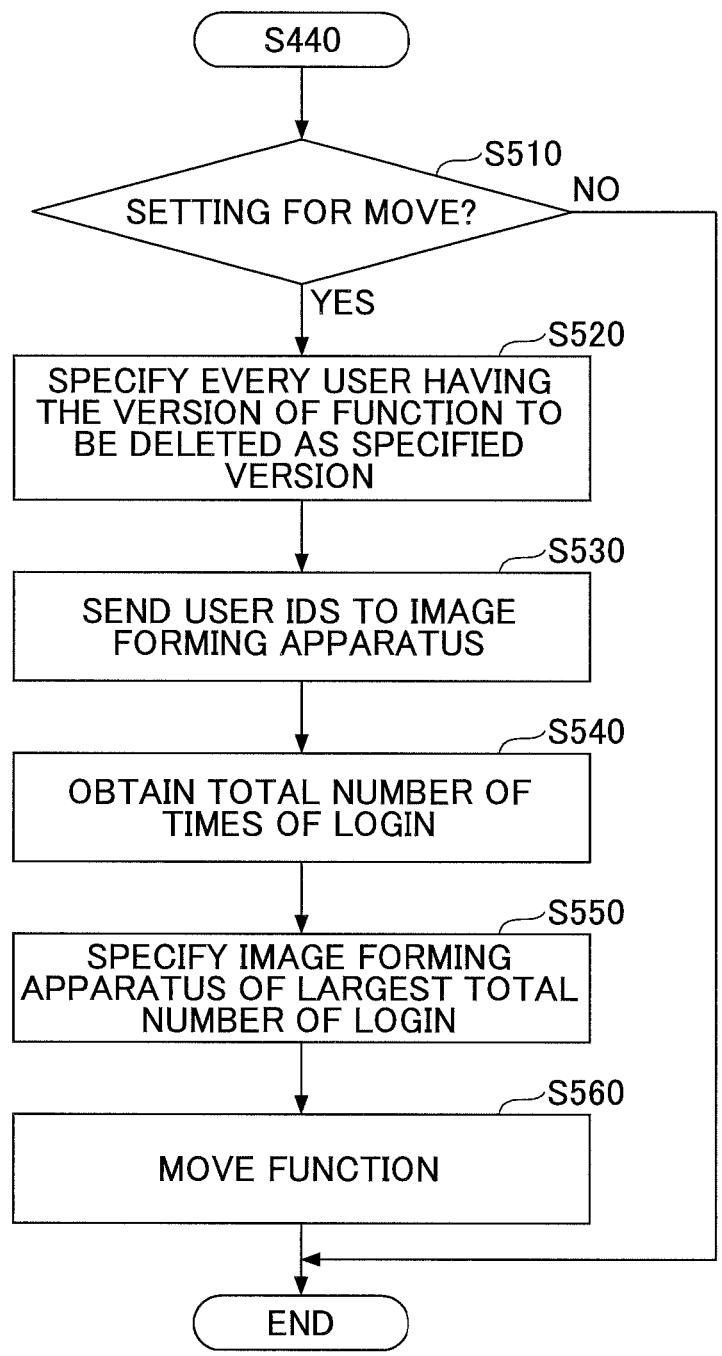

IMAGE FORMING APPARATUS, EQUIPMENT SYSTEM, AND COMPUTER-READABLE STORAGE MEDIUM

CROSS-REFERENCE TO RELATED APPLICATIONS

This application claims the benefit of a Japanese Patent Application No. 2010-161902 filed on Jul. 16, 2010, in the Japanese Patent Office, the disclosure of which is hereby incorporated by reference.

BACKGROUND OF THE INVENTION

1. Field of the Invention

The present invention relates to an image forming apparatus for introducing a program licensed to a user. More particularly, the present invention relates to an image forming apparatus, an equipment system, a program management method and a recording medium for managing introduction of different versions of a same program.

2. Description of the Related Art

An apparatus such as a copier, a scanner, a printer, a FAX or a multi-functional machine (to be also referred to as MFP) having these functions includes an information processing apparatus in the inside. Performance of a CPU that can be mounted on the information processing apparatus is improving, and large-capacity memories are being provided at a low price.

Also, apparatuses are being networked. Thus, a distribution method has become possible in which a user purchases an application as necessary and downloads the application via a network to install the application in the apparatus, instead of shipping the apparatus in which the application has been already installed (sold in packs).

Installation of an application into an apparatus is managed based on presence or absence of a license (use right) for the purpose of prevention of illegal use. An entity of the license is a license key notified when a user legally purchases the application, for example. The user enters the license key when installing the application, so that the user can install the application to the apparatus.

Also, there is a case in which a license is managed by registering information of an apparatus having use right in a license server. In this case, when the user uses the application after installing the application, the user accesses the license server and requests license authentication of the apparatus from the license server. When the authentication succeeds, the user can use the application of the apparatus.

However, in these management methods of the license, the authentication target is the "apparatus (a serial code unique to the apparatus, for example)" in which the application is to be introduced.

On the other hand, there is a license form called floating license in which presence or absence of license is managed based on the number of installed applications. In the floating license, an upper limit number of licenses is determined at the time of contract of the license, and introduction of the application is not limited to a particular apparatus, but is permitted to a plurality of apparatuses unless the number of apparatuses exceeds the upper limit number.

Also, there is a situation in which it is appropriate to manage the license in units of "individuals" instead of in units of apparatuses or using the upper limit. Taking an image forming apparatus as an example, there is a case in which an individual user purchases an application (utility) developed by a third vendor and introduces the application in the image forming apparatus that the individual user uses in his/her Office. Since the application is purchased and introduced by the individual user instead of being purchased by an organization or a department, it is necessary that only the individual user can use the application. In the following, the user based license is referred to as a license tied to a user.

As examples of applications purchased by an individual, there are a simple calculator, an application for providing various gadgets, and, an application for changing a screen or an operation flow into a unique one registered by the individual in order to change appearance and usability, for example.

As to an application that requires a license tied to a user, the user can use the application not only for an apparatus into which the user introduced the application but also for other apparatuses. For example, even when the user is on a business trip or even when the user temporarily works in a floor different than usual, the user can use the application. In this case, if management of the license is in units of apparatuses, it is necessary to newly introduce the license to the apparatus for temporary use after deleting a corresponding application (by returning license) from the apparatus in which the corresponding application has been introduced beforehand. On the other hand, in the form of license management in units of individuals, it is possible that a license server specifies, in conjunction with user login (individual specification), an application licensed to the login user so as to instantly introduce the application to the login apparatus, for example (Refer to a patent document 1: Japanese Laid-Open Patent Application No. 2008-047056, for example).

The patent document 1 discloses an application management method for determining presence or absence of a license tied to a user at the time of login by the user. When there is an application licensed to the user, the application is downloaded and installed in an apparatus into which the user logged.

However, as to the management method described in the patent document 1, there is a problem in that differences of versions of a same function are not considered. For example, in the case when the license is managed as the form tied to users and an apparatus is shared by a plurality of users, a preferred version of function cannot be introduced for each user unless differences of versions are considered.

SUMMARY OF THE INVENTION

Accordingly, it is an object in one embodiment of the present invention to provide an image forming apparatus, an equipment system and a computer-readable storage medium for managing different versions of a program complying with the license form tied to individual users.

According to one aspect of the present invention, there is provided an image forming apparatus including:

a login unit configured to receive a login of a user;

a program storage unit configured to store programs;

a function introduction unit configured to obtain a first program licensed to the user and license information of the first program, and to store the first program and the license information in the program storage unit without deleting a second program that is a different version of the first program from the program storage unit;

a user information storage unit configured to store user information that registers license information of programs introduced by the function introduction unit and version information of the programs with user IDs; and a function providing unit configured to specify license information and version information that are associated with a user ID of a user who logs into the image forming apparatus in order to provide a function realized by a program corresponding to the license information and the version information to the user.

Other objects and further features of the present invention will be apparent from the following detailed description when read in conjunction with the accompanying drawings.

BRIEF DESCRIPTION OF THE DRAWINGS

FIG. 2 is an example of a diagram for explaining inconvenience arising when each user introduces a respective version of a function to an apparatus;

FIG. 20A shows an example of a version specifying screen displayed on the operation panel 125 when the user changes the specified version of the user information 21;

FIG. 20B shows an example of a screen displayed on the operation panel 125 when a manager changes the default setting of the specified version;

FIG. 21 shows an example of the apparatus configuration information 22;

FIG. 27 is an example of a flowchart for explaining a procedure in which the launch unit 16 automatically executes a function and the function halt unit 17 automatically halts the function;

FIG. 28A shows an example of the apparatus configuration information 22;

FIG. 28B shows an example of the apparatus configuration information 22;

FIG. 32 is an example of a flowchart showing a procedure in which the function move unit 19 determines an image forming apparatus 100 of a move destination.

DESCRIPTION OF THE PREFERRED EMBODIMENTS

Prior to describing an embodiment of the present invention, a problem will be described with reference to figures for convenience of understanding.

Figure 1B:
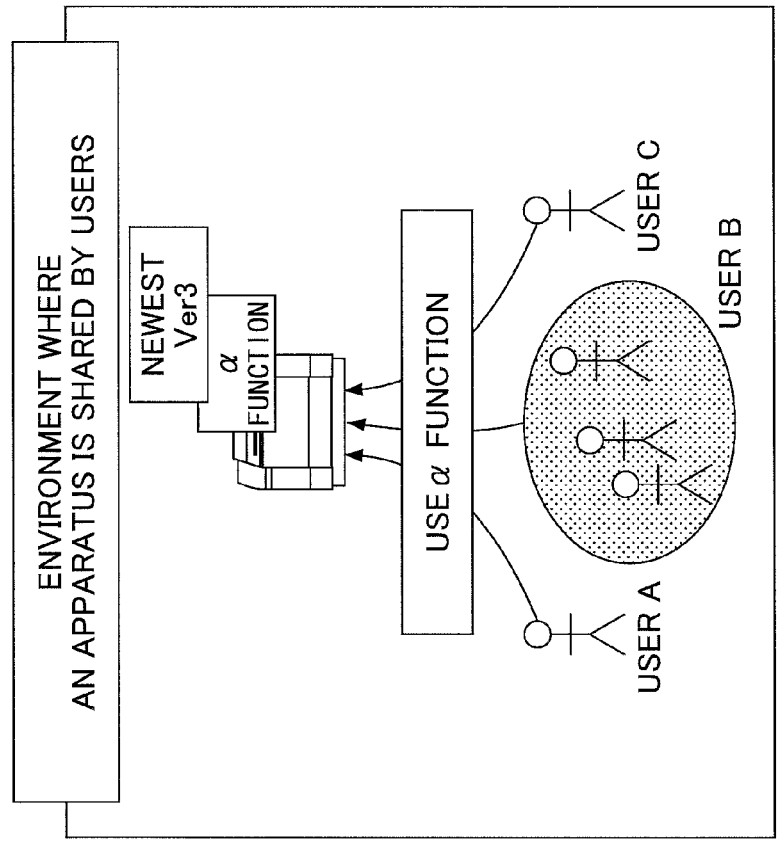
FIG. 1B is an example of a diagram for explaining a problem caused by different versions of a same function.
Figure 1A:
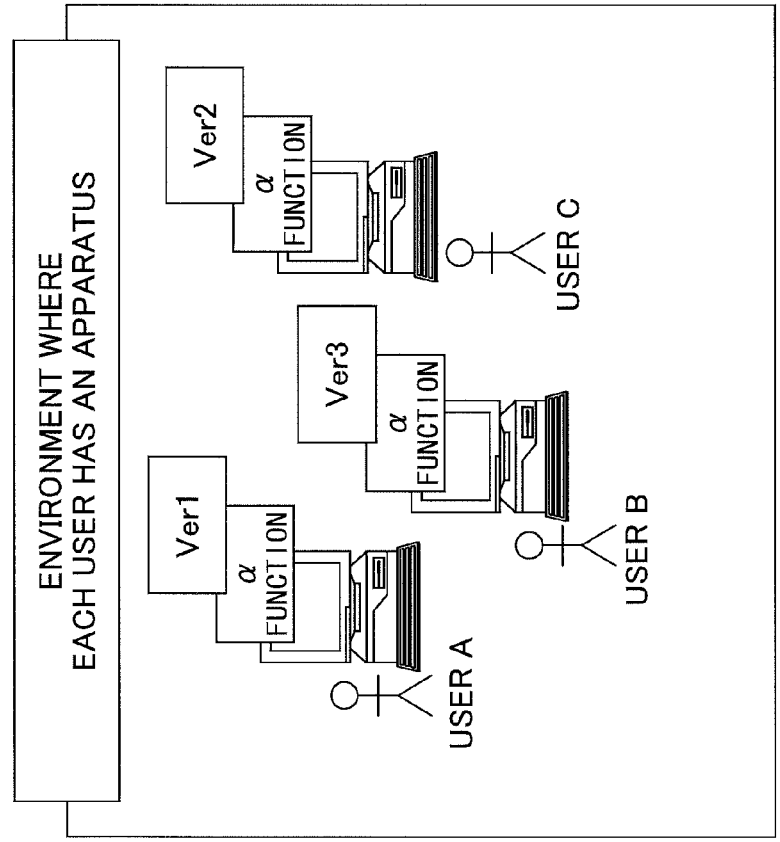
FIG. 1A is an example of a diagram for explaining a problem caused by different versions of a same function.

FIGS. 1A and 1B are figures for explaining a problem of an apparatus caused by different versions of a same function. FIG. 1A shows an example in which a function that is the same function is introduced in each of three PCs (Personal Computers). Also, FIG. 1A shows an environment in which each user can use the apparatus (PC) exclusively. In such an environment, it is rare that differences of versions of the α function introduced in each apparatus causes a problem. For example, a user A uses Version 1 of the function because of preference of the UI (user interface) of the version, and a user B uses Version 3 because the user B wants to use a newest function, and a user C uses Version 2 because the version is easy to use. In such a case, it is rare that inconveniences occur.

On the other hand, FIG. 1B shows an example of an environment in which a plurality of users collectively use the α function introduced in one apparatus. Version 3 of the α function that is the newest version is introduced in the apparatus. Users prefer the newest version in general. But, in the case shown in FIG. 1B, since the user A prefers Version 1 for UI appearance and the user C prefers Version 2 for ease of use, the users A and C cannot use the respective preferable versions of the α function.

The inconvenience cannot be solved only by installing a preferable version of the function by each user individually.

FIG. 2 is an example of a figure for explaining inconvenience arising when each user introduces a respective version of the α function to each apparatus.

In (a) of FIG. 2, the user A introduced the α function into an apparatus on the 9th floor. For purchasing and introducing the α function, any method can be used. For example, after purchasing the α function on a store website, the function can be introduced into the apparatus using a license key. Also, for example, after purchasing the α function on a store website, the function can be automatically introduced at the time of login.

In (b) of FIG. 2, one month after the user A introduced the α function to the apparatus on the 9th floor, the user B introduced the α function to an apparatus on the second floor. Since the α function has been upgraded between the time of (a) and the time of (b), Version 2 of the α function that is the newest version is registered in a server. Therefore, in (b) of FIG. 2, the version of the α function introduced in the apparatus is Version 2.

In this example, it is assumed that a license is tied to each user, and that the tied function can be used by login of the user.

FIG. 2(c) is an example of a figure for explaining inconvenience when the user B uses the apparatus on the 9th floor. The user B logs into the apparatus on the 9th floor, so that the user B can use the α function. However, since the user B is used to using the Version 2 of the α function, the user B feels something is wrong due to downgrade of the version into Version 1 and due to difficulty for finding preferred settings, for example.

FIG. 2(d) is an example of a figure for explaining inconvenience when the user A uses the apparatus on the second floor. The user A logs into the apparatus on the second floor, so that the user A can use the α function. However, since the user A is used to using the Version 1 of the α function, the user A feels something is wrong due to upgrade of the version into Version 2 and due to difference of use, for example.

There are functions (applications) such as a browser and music management software in which usability and appearance and the like largely change according to versions. But, in the past, in the case of the license management form tied to users, versions of a function were not managed for providing the function based on the license.

Also, when a user installs the newest version of an application into a PC in which an old version of the application has been already installed, there are many cases where an install program requests the user to delete the old version of the application or the old version of the application is overwritten with the new version of the application. In the past, it has not been performed to keep a status in which the old version and the new version of the same application are installed in the same apparatus. Also, an apparatus for selectively providing a version specified by a user has not been invented.

In the following, an embodiment for carrying out the present invention is described with reference to figures. According to the embodiment, there is provided an image forming apparatus for managing different versions of a program complying with the license form tied to individual users.

[Features of Image Forming Apparatus]

Figure 3:
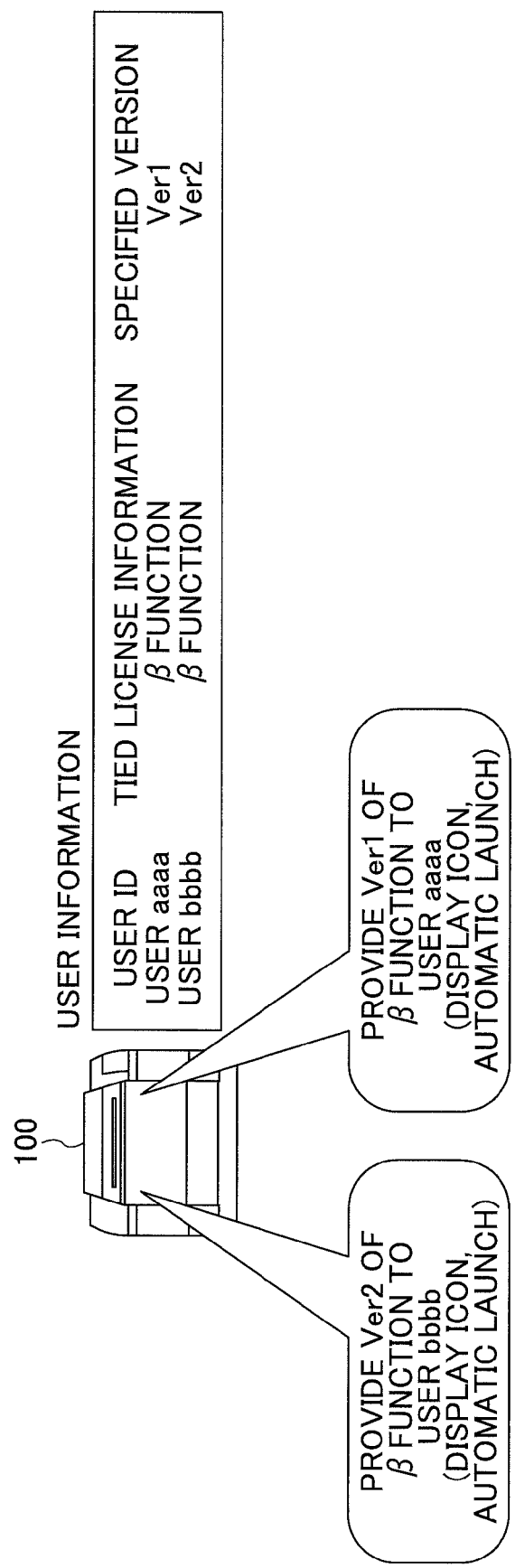
FIG. 3 is an example of a diagram for explaining schematic features of an image forming apparatus 100.

FIG. 3 shows an example of a figure for explaining schematic features of an image forming apparatus 100 of the present embodiment. The image forming apparatus 100 stores user information as shown in the figure. The user information includes "user ID", "tied license information", and "specified version". It is one of characteristic features that "tied license information" and "specified version" are registered.

The image forming apparatus 100 refers to the tied license information based on a user ID of a user who logs in so as to detect a function tied to the user. When there is the function tied to the user, the image forming apparatus 100 reads the "specified version" corresponding to the function, and provides the version of the function to the user who logs in.

For example, when a user aaaa logs into the image forming apparatus 100, the image forming apparatus 100 provides Version 1 of β function to the user aaaa. When a user bbbb logs into the image forming apparatus 100, the image forming apparatus 100 provides Version 2 of β function to the user bbbb.

"Provide" includes displaying an icon linked to a function of the version on an operation panel, for example. That is, the image forming apparatus 100 displays an icon for calling the specified version of the function specified by the user. Also, "provide" includes launching the function of the version without operation by the user (to be referred to as automatic launch hereinafter), for example. That is, the image forming apparatus 100 launches the specified version of the function without displaying the icon of the function and without receiving an instruction for launching the function.

Therefore, the image forming apparatus 100 of the present embodiment can provide a user with a version of a function that the user can use easily from among a plurality of versions of the same function.

For the sake of convenience of explanation, terms to be used in the present embodiment are briefly defined as follows.

"Function" is a function to be provided by an application. In the following, there is a case where "function" and "application" are used synonymously. "Introduction of a function" is to set an apparatus such that a user can use the function on the apparatus. "Introduction" is almost the same as the meaning of "install" and "activation". If the function is already installed, only "activation" applies. "Activation" means to set the function (application) to be usable by verifying an authorized license.

"Application" includes various programs. For example, as the "application", there are utility programs such as a calculator, an electronic calendar and a scheduler, screen change software for rearranging placement of colors and icons on a screen as predefined, control software for setting pre-registered print condition/read condition/FAX transmission destination and the like into the apparatus, and software for providing basic functions such as copy/scanner/FAX and the like.

"Tied license" is a license for permitting a user, instead of an apparatus, to use a function. "Tied license information" is an entity of the tied license (license key, for example). In the present embodiment, the tied license information also serves as a function name of the function. On the other hand, the form of license for permitting an apparatus to use a function is called "normal license". Also, there is also a function that the user doesn't need to purchase separately from the apparatus, and such function is called a default function (there is no license information).

Therefore, a user cannot launch an application if only the application exists. By registering tied license information corresponding to the application, the application can be launched by the user. Or, by accessing the tied license information, the application can be installed.

[Whole Configuration]

Figure 4:
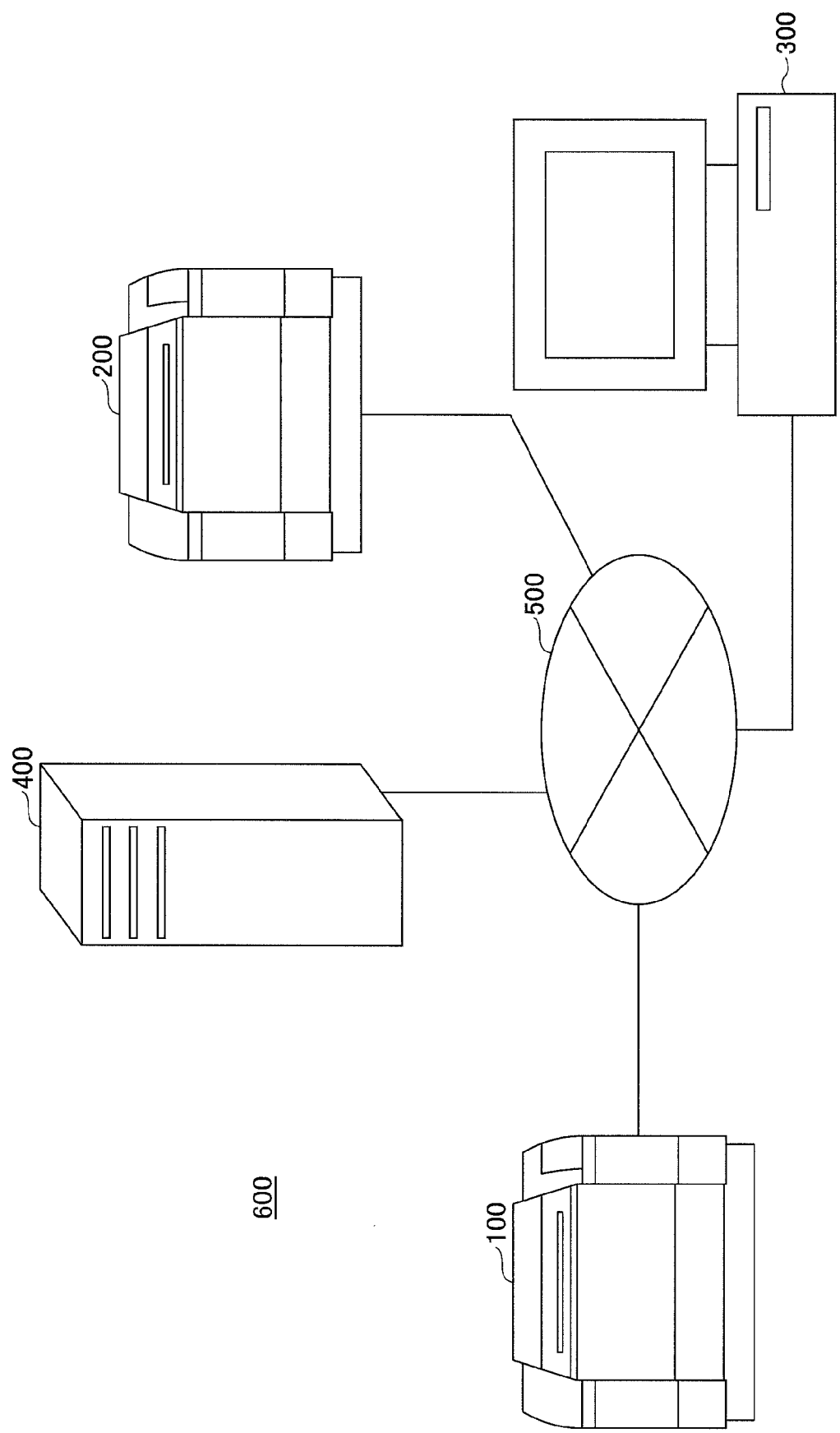
FIG. 4 is an example of a block diagram of an equipment system 600.

FIG. 4 shows an example of a block diagram of an equipment system 600. The image forming apparatus 100 is connected to an image forming apparatus 200, a sales server 300 and a license server 400 via a network 500. The image forming apparatus 100 includes one or more functions such as a printer function, a scanner function and a FAX function and the like. The image forming apparatus 100 may be also called as a MFP (Multifunction Peripheral).

The sales server 300 is a server for selling functions to users and to apparatuses. The license server 400 is a server for managing functions licensed to users. For the sake of convenience of explanation, it is assumed that the license server 400 acts as a server for introducing a function to an apparatus into which a user logs. But, a server for storing functions may be provided as a server different from the license server 400. The image forming apparatus 200 is an image forming apparatus similar to the image forming apparatus 100 at which a user uses functions. Since a function is automatically introduced into the image forming apparatus 200, the user can use a purchased function not only in the image forming apparatus 100 but also in the image forming apparatus 200. In this point, the tied license becomes more effective than the normal license. Also, since the image forming apparatus 200 is provided with a computer, the image forming apparatus 200 can serve as one or more of the sales server 300 and the license server 400. The network 500 is a LAN, a WAN (VLAN, VPN), or the Internet or the like. The network 500 may be either a cable network or a wireless network.

Figure 5:
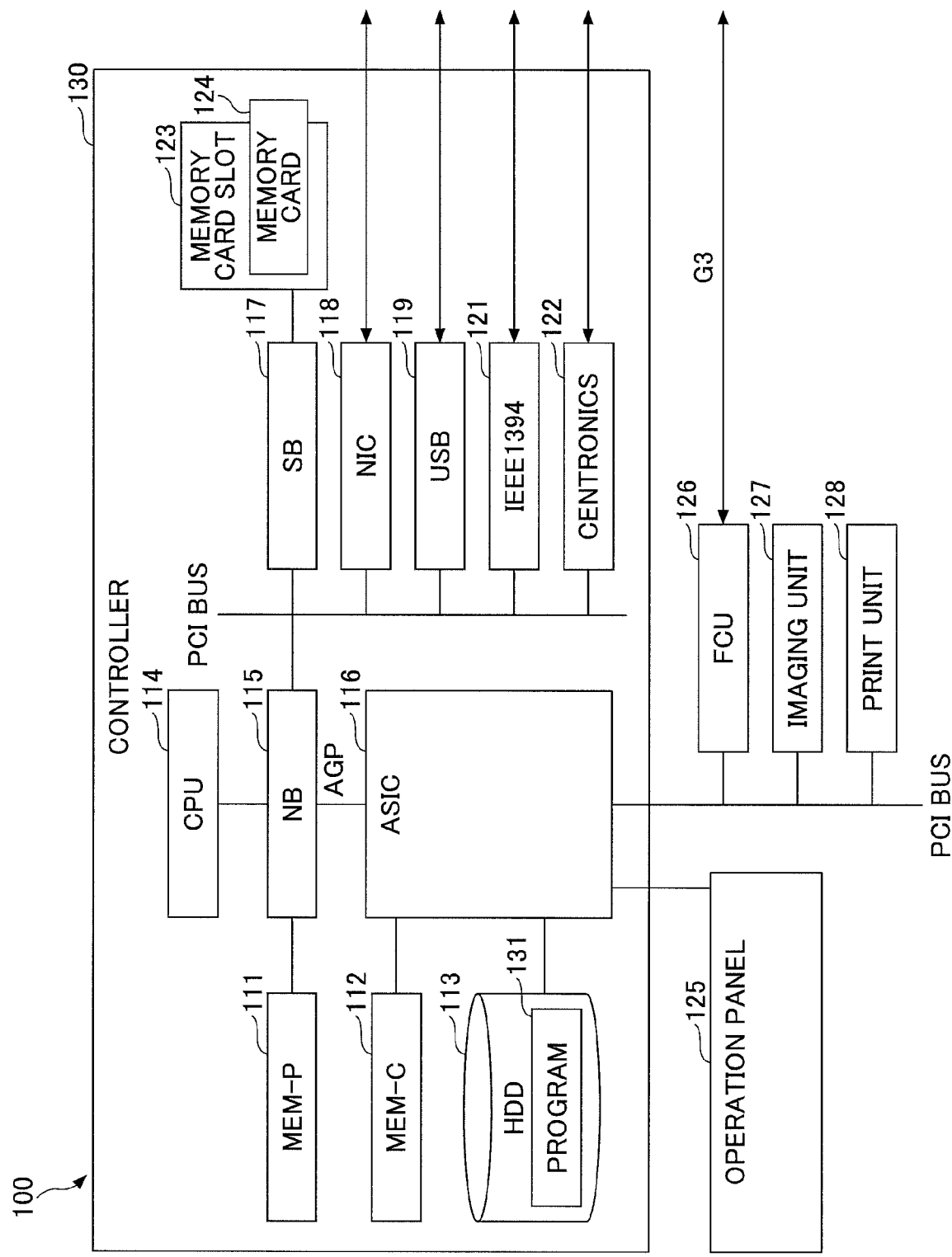
FIG. 5 is an example of a hardware block diagram of the image forming apparatus 100.

FIG. 5 shows an example of a hardware block diagram of the image forming apparatus 100. The image forming apparatus 100 includes a controller 130, an operation panel 125, a facsimile control unit (FCU) 126, an imaging unit 127 and a printing unit 128.

The controller 130 includes a CPU 114, an ASIC 116, a NB (north bridge) 115, a SB (south bridge) 117, a MEM-P (system memory) 111, a MEM-C (local memory) 112, a HDD (hard disc drive) 113, a memory card slot 123, a NIC (network interface controller) 118, a USB device 119, an IEEE1394 device 121, and a Centronics device 122.

The CPU 114 is an IC for executing various information processing, and executes an application, a platform and an option package in parallel in units of processes based on an operating system (OS) such as the UNIX®. The ASIC 116 is an IC for image processing. The NB 115 is a bridge for connecting between the CPU 114 and the ASIC 116. The SB 117 is a bridge for connecting the NB 115 with peripherals. The ASIC 116 and the NB 115 are connected via the AGP (Accelerated Graphics Port).

The MEM-P 111 is a memory connected to the NB 115. The MEM-C 112 is a memory connected to the ASIC 116. The HDD 113 is a storage connected to the ASIC 116. The HDD 113 is used for image data storage/document data storage/program storage/font data storage/form data storage and the like. The HDD 113 stores the above-mentioned various applications and programs 131.

The memory card slot 123 is connected to the SB 117, and is used for setting (inserting) the memory card 124. The memory card 124 is a flash memory such as a USB memory, and is used for distributing the program 131. Also, the program 131 can be distributed by downloading it to the image forming apparatus 100 from a predetermined server.

The NIC 118 is a controller for performing data communication via the network 500 using a MAC address and the like. The USB device 119 is a device for providing serial ports complying with the USB standard. The IEEE1394 device 121 is a device for providing serial ports complying with the IEEE1394 standard. The Centronics device 122 is a device for providing parallel ports complying with the Centronics specification. The NIC 118, the USB device 119, the IEEE1394 device 121, the Centronics device 122 are connected to the NB 115 and the SB 117 via the PCI (Peripheral Component Interconnect) bus.

The operation panel 125 is hardware (operation unit) for entering data to the image forming apparatus 100 by the user. Also, the operation panel 125 is hardware (display unit) for the image forming apparatus 100 to provide visual information to an operator. The operation panel 125 is connected to the ASIC 116. The FCU 126, the imaging unit 127, and the printing unit 128 are connected to the ASIC 116 via the PCI (Peripheral Component Interconnect) bus.

Figure 6:
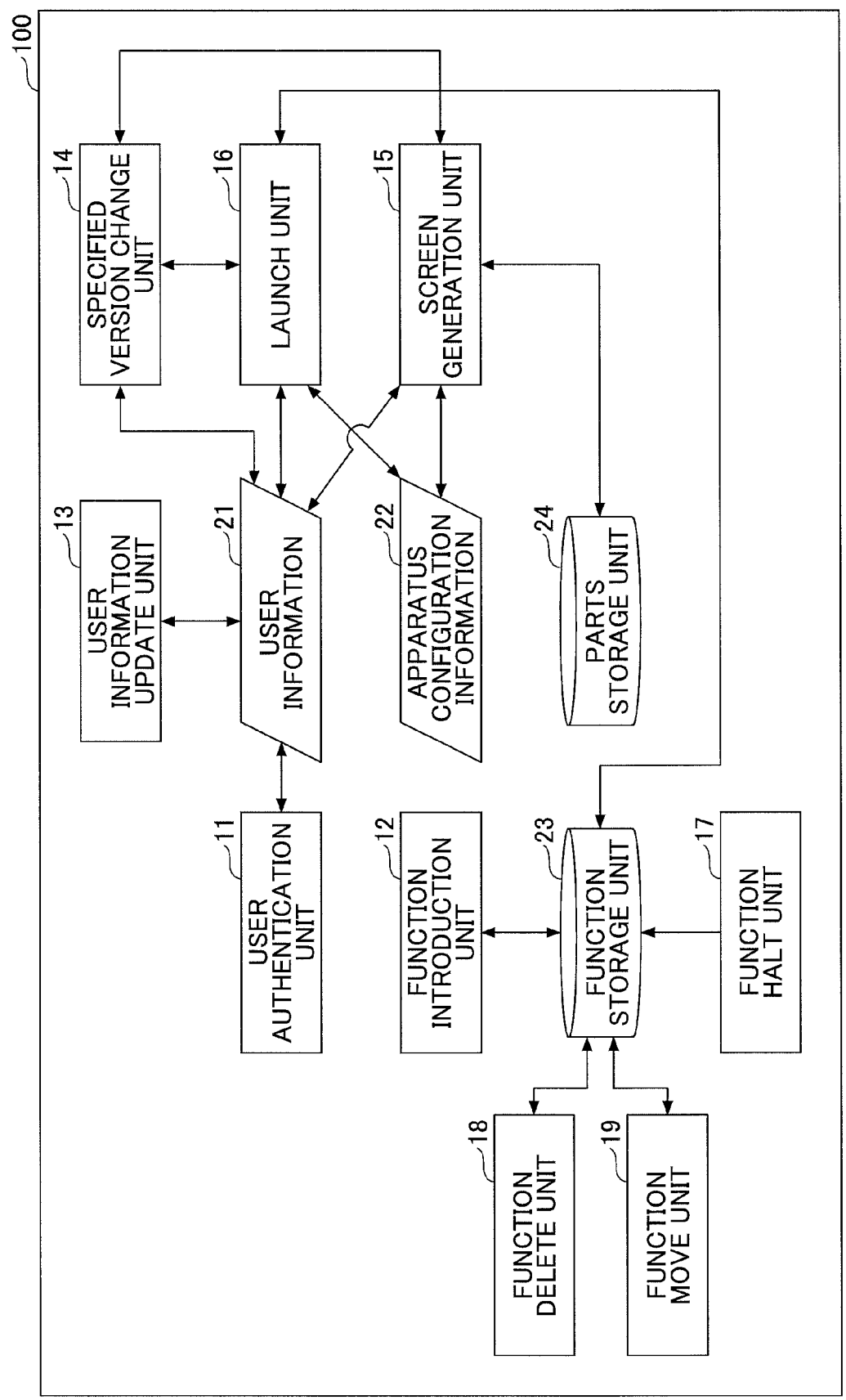
FIG. 6 is an example of a functional block diagram of the image forming apparatus 100.

FIG. 6 shows an example of a functional block diagram of the image forming apparatus 100. The image forming apparatus 100 includes a user authentication unit 11, a function introduction unit 12, a function halt unit 17, a user information update unit 13, a screen generation unit 15, a launch unit 16, a specified version change unit 14, a function delete unit 18, and a function move unit 19, which are realized by executing a program by the CPU. The program may be stored in any suitable non-transitory computer-readable storage medium, including the memory card 124, the HDD 13 or the like. For example, the program stored in the computer-readable storage medium may be installed in the image forming apparatus 100 via the memory card slot 123. Moreover, the program may be downloaded via a communication line and installed in the image forming apparatus 100 via the NIC 118, for example.

Also, the image forming apparatus 100 includes user information 21 and apparatus configuration information 22 stored in the HDD 13 and the like, and includes a function storage unit 23 and a parts storage unit 24 which are realized by the HDD 13 and the like.

In the following, each function block is briefly described. The user authentication unit 11 authenticates a user based on whether a set of a user ID and a password entered by the user is registered in the user information 21. The function introduction unit 12 introduces a specified version of a function of a specified version from the license server 400 if the specified version of the function is not registered in the image forming apparatus 100, wherein the function is one licensed to the user who logs in.

The user information update unit 13 updates tied license information and specified version in the user information 21 by communicating with the license server 400. The specified version change unit 14 changes the specified version registered in the user information 21.

The screen generation unit 15 selects an icon linked to the specified version of the function, and displays the icon on an operation screen which is displayed on the operation panel 125. The launch unit 16 automatically launches the specified version of the function. The function delete unit 18 deletes a function introduced in the image forming apparatus 100. The function halt unit 17 halts an automatically-launched function. The function move unit 19 moves the deleted function to another image forming apparatus 200.

The function storage unit 23 is a storage unit for storing functions (that is, applications). The parts storage unit 24 is a storage unit for storing parts such as various icons and characters that form the operation screen.

[User Information 21]

Figure 7:
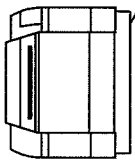
FIG. 7 is an example of a diagram schematically showing user information 21.

FIG. 7 is an example of a diagram schematically showing the user information 21. In the user information 21, passwords, tied license information and specified versions are registered being associated with the user ID.

The user ID is unique identification information for specifying the user when logging into the apparatus. The user ID is not only unique in one apparatus but also unique in all apparatuses that the user may use, such that uniqueness is assured in the license server 400, for example. For example, an employee number may be used as a user ID.

The password is information for authenticating a user. The user authentication unit 11 authenticates a user by determining whether a set of a user ID and a password entered in the apparatus by the user when logging into the apparatus is the same as a set of a user ID and a password that are registered. In figures hereinafter, password is not shown in the user information 21.

As mentioned above, the tied license information is a function name (license information) of a function licensed in the license form in which a license of a function is provided to each user.

The specified version is a version that a user wishes to use. As shown in the figure, the user can set not only a number for specifying a version but also information such as "always new".

If the user ID and the password are registered, each user can register the specified version individually. The setting method is described later.

[Apparatus Configuration Information 22]

Figure 8:
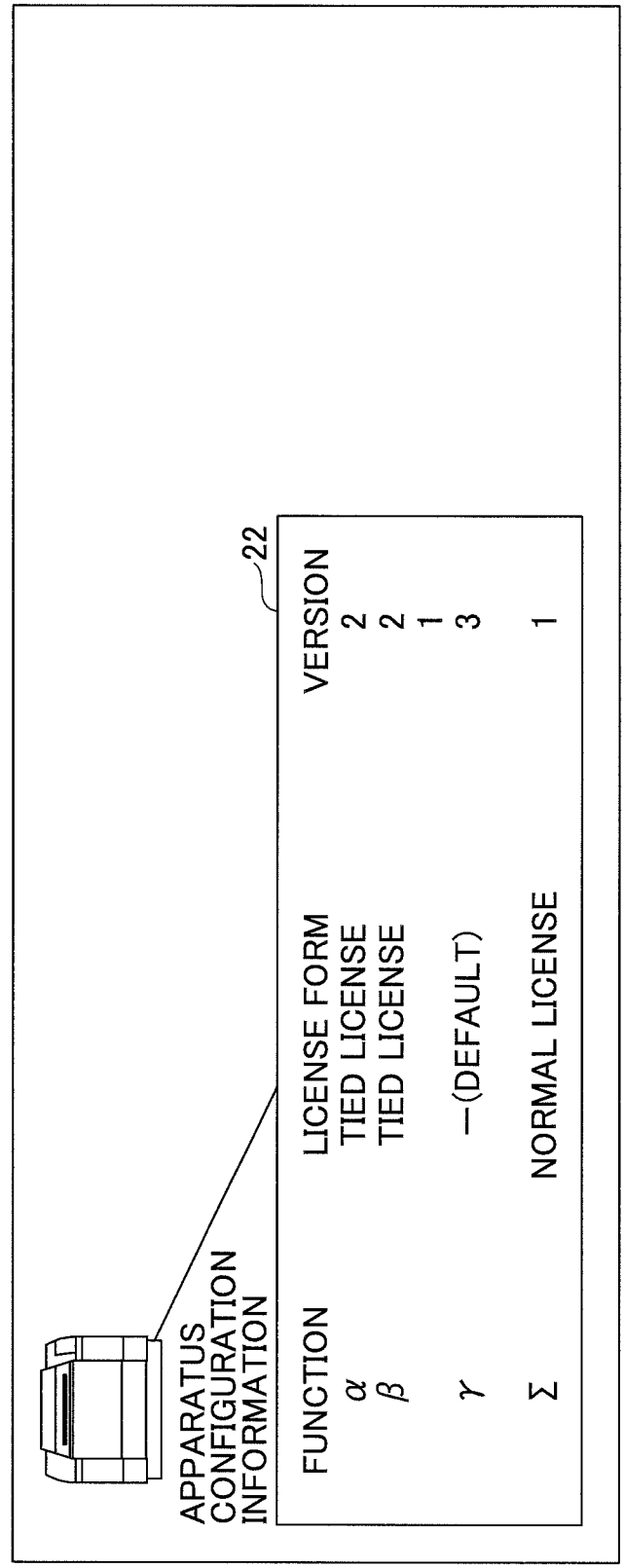
FIG. 8 is an example of a diagram schematically showing apparatus configuration information 22.

FIG. 8 is an example of a diagram schematically showing the apparatus configuration information 22. Pieces of information of functions introduced to the image forming apparatus 100 are registered in the apparatus configuration information 22. As shown in the figure, license forms and versions are registered being associated with each function such as α function, β function, γ function and Σ function. As mentioned above, "-(default)" as a license form indicates that the corresponding function is a function that the user does not need to purchase other than the apparatus. The "normal license" indicates that the corresponding function is a function that is admitted to use for the image forming apparatus 100.

"Version" is a version of a function introduced in the image forming apparatus 100. In the case where the license form is the tied license, a plurality of versions of a function may be introduced. Thus, there may be a case where a plurality of versions are registered for a function of the license form of the tied license.

As mentioned above, by introducing a plurality of versions of a function in the image forming apparatus 100, the image forming apparatus 100 can provide a version of the function that each user desires, so that the image forming apparatus 100 can provide a same function to users with various forms.

[Purchase of Function and Update of License Management Information]

Figure 9:
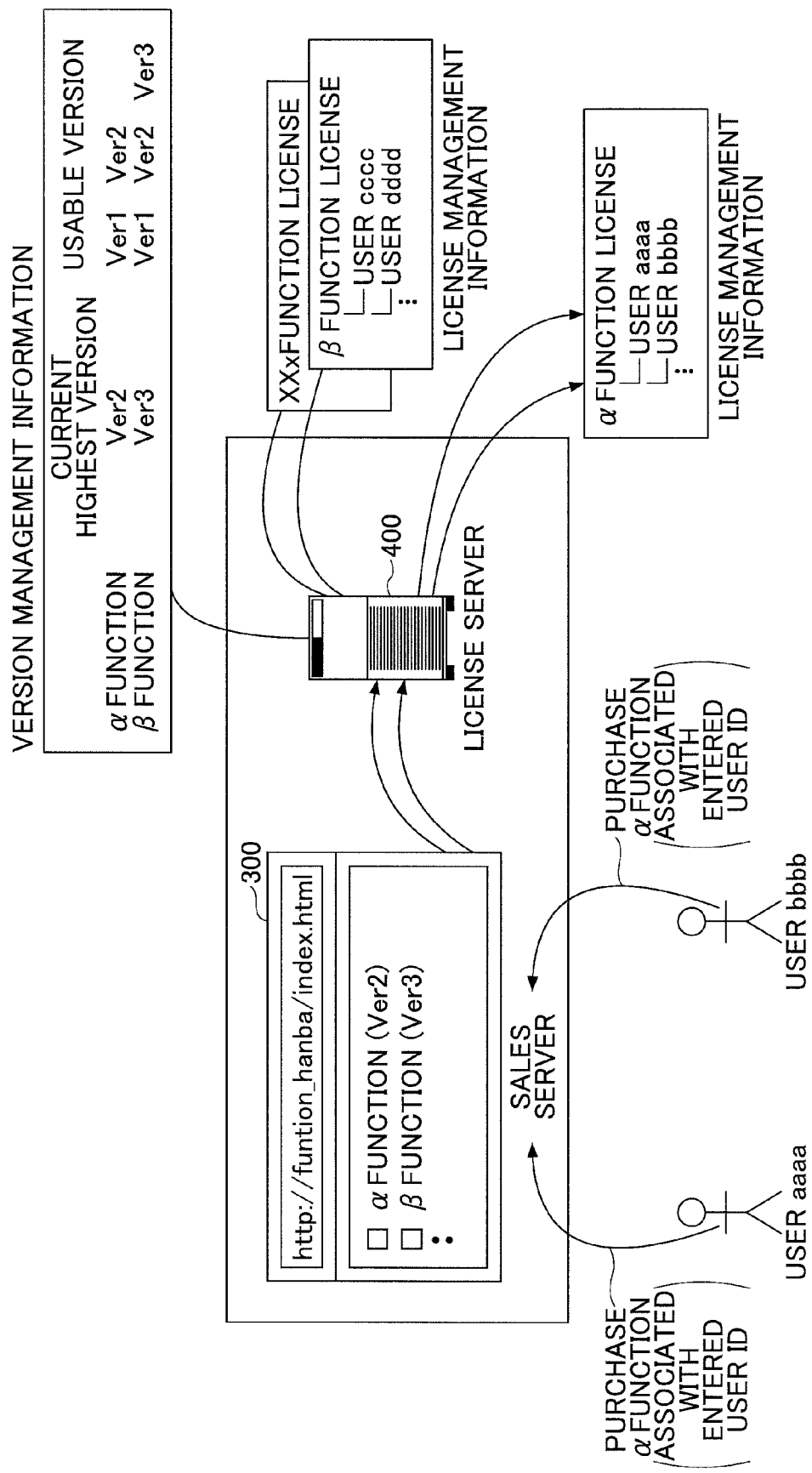
FIG. 9 is an example of a diagram for explaining operation of obtaining a license.

FIG. 9 is an example of a diagram for explaining operation for obtaining a license. Each of a user aaaa and a user bbbb launches a browser by operating a PC (Personal Computer) not shown in the figure to access the sales server 300. Each of the user aaaa and the user bbbb enters a user ID, and selects a function the user wants to buy from "α function", "β function" and the like.

The browser receives a selection of a function, and transmits a user ID and a function name to the sales server 300. Although both of the user aaaa and the user bbbb purchases the α function in the figure, this is merely an example. Each of the user aaaa and the user bbbb pays using a predetermined paying method, so that each of the user aaaa and the user bbbb can obtain tied license information of the α function.

Since the current version of the α function is Version 2, "Ver2" is shown next to "α function". In the present embodiment, a user who purchased a tied license of a function can use any version of the function. Thus, it is not necessary to display a version. Alternatively, a version can be selected for purchase. By displaying the version, the user can know a version of the function that the user purchased.

Even though a higher version of the function is released after purchasing the function, the user is not requested to pay additional fees for using the upgraded function.

After the sales server 300 sells the function to the user, the sales server 300 sends a function name of the sold function and the user ID to the license server 400. The license server 400 manages license management information. The license management information is information in which each function is associated with user IDs. In the figure, the user aaaa an the user (bbbb) are registered for the α function.

By referring to the license management information, the license server 400 can specify every function tied to a user by specifying a user ID of the user (it may be other information tied to login). Also, different from the normal license in which a function is licensed to the image forming apparatus 100, it is not necessary to issue a license key from the license server 400 to the PC in the tied license. The reason is that, in the tied license, it is not necessary for the user to enter a license key in order that the license server 400 may specify the apparatus. By accessing the license server 400 at a desired timing, the image forming apparatus 100 can introduce a licensed function.

For the purpose of comparison, the normal license in which a function is licensed to an apparatus is described. When a user introduces a function by specifying an apparatus, a license server issues a license key when purchasing a function from the sales server 300. The user executes introducing processing by using the license key on an apparatus to which the user wants to introduce the function. When introducing the function, information (serial ID for specifying the apparatus, and the like) of the apparatus is transferred to the license server 400. Accordingly, the license server 400 can manage the apparatus and the license key by associating them with each other (a function based on a license is introduced in an apparatus). Therefore, even if a third party obtains a license key, the third party cannot use the application in apparatuses other than the apparatus having a serial number corresponding to the license key.

Also, the license server 400 includes version management information. The version management information includes "current highest version" and "usable version" for each function. The current highest version is the newest version of the function, and the usable version is a version released in the past for the function.

[Update Timing of the User Information 21]

The license management information of the license server 400 is changed when a user purchases a function and when a user lost a tied license, for example. Therefore, it becomes necessary that the image forming apparatus 100 updates tied license information and the specified version in the user information 21.

Figure 10:
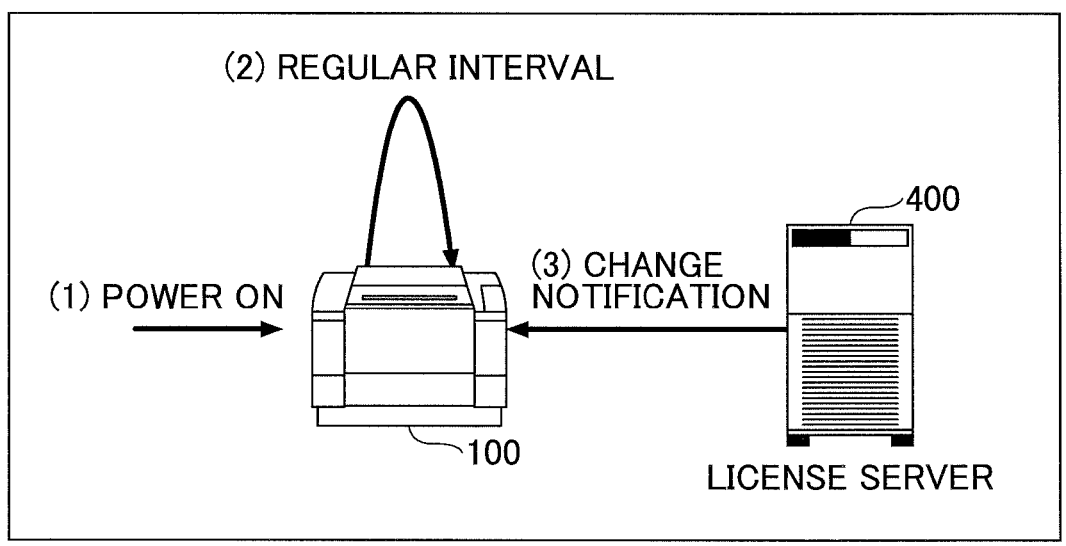
FIG. 10 is an example of a diagram for, explaining a timing for the image forming apparatus 100 to update the user information 21.

FIG. 10 is an example of a figure for explaining a timing for the image forming apparatus 100 to update the tied license information and the specified version in the user information 21. As the timing, there are following examples.

(1) Right after the apparatus is powered on;
(2) At regular intervals while the apparatus is powered on; and
(3) At a time when the apparatus receives a notification of change of license management information from the license server 400.

One or more of (1)-(3) is set in the image forming apparatus 100. The image forming apparatus 100 detects a timing corresponding the setting and accesses the license server 400.

Figure 11:
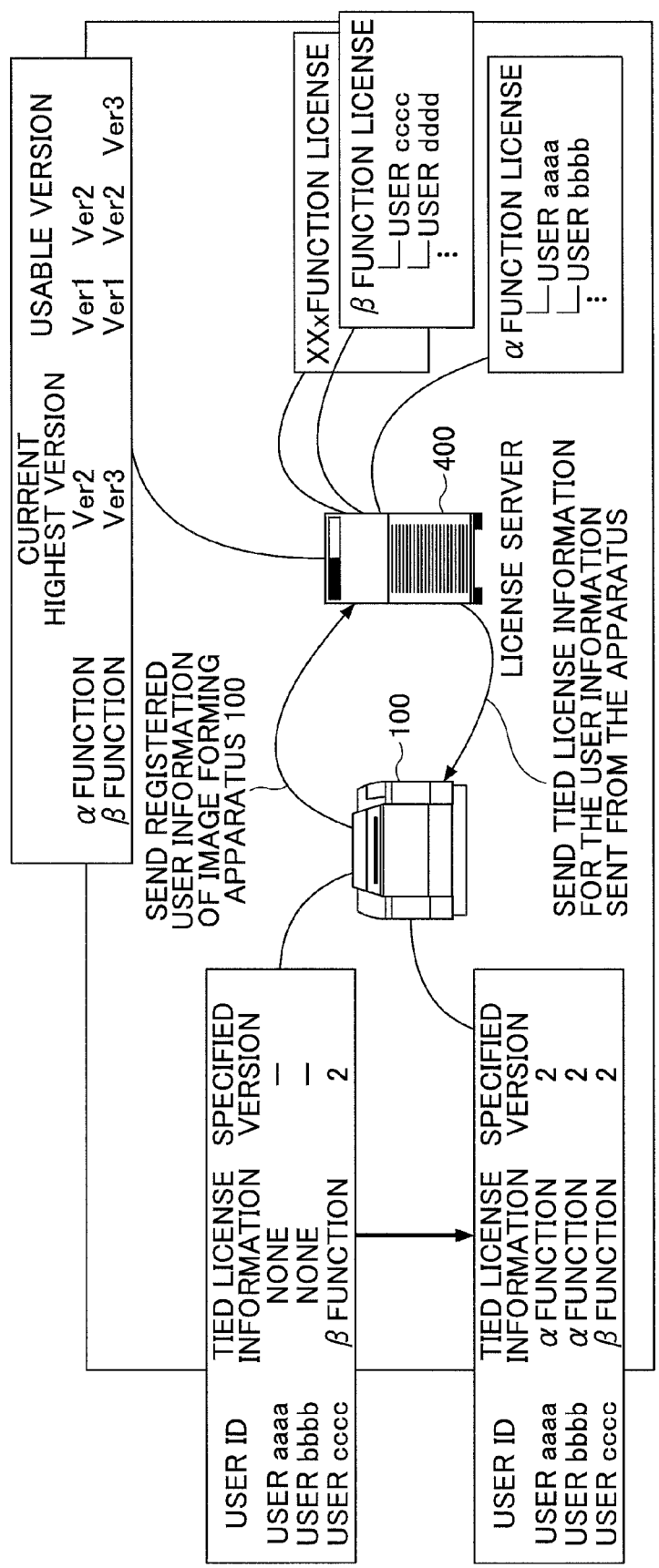
FIG. 11 is an example of a diagram for explaining a procedure for updating the user information 21 by the image forming apparatus 100.

FIG. 11 is an example of a figure for explaining a procedure for updating the user information 21 by the image forming apparatus 100. According to the user information 21 of the apparatus before update, there is "no" tied license information for the user aaaa and the user bbbb, tied license information for the user cccc is "β function", and the specified version for the user cccc is "ver1".

On the other hand, according to the license management information of the license server 400, "α function" is tied to the user aaaa and the user bbbb. Therefore, the image forming apparatus 100 needs to update the user information 21.

Figure 12:
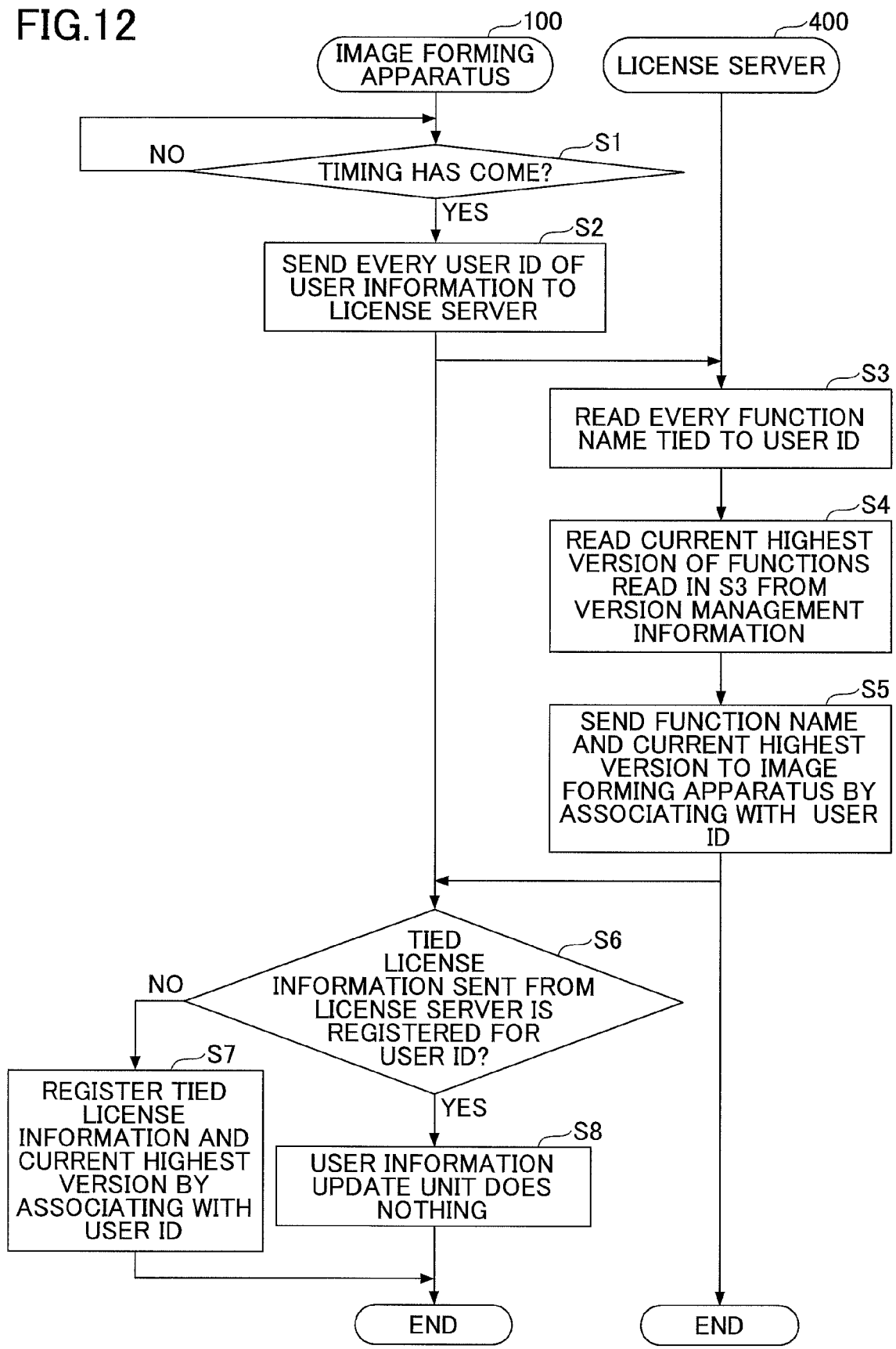
FIG. 12 is an example of a flowchart showing a procedure for updating the user information 21 by a user information update unit 13.

FIG. 12 is an example of a flowchart showing a procedure for updating the user information 21 by the user information update unit 13.

First, the user information update unit 13 determines whether the set timing is detected (S1).

When the timing is detected (Yes in S1), the user information update unit 13 sends all of user IDs of the user information 21 to the license server 400 (S2).

The license server 400 reads all of function names tied to the user IDs (S3). For example, the α function is read for the user aaaa, the α function is read for the user bbbb, and the β function is read for the user cccc.

Also, the license server 400 reads the current highest versions of the read functions from the version management information (S4). The current highest version of the α function is Version 2, and the current highest version of the β function is Version 3.

The license server 400 sends the function names and the current highest versions to the image forming apparatus 100 by associating them with the user IDs (S5). There may be a case where a plurality of tied licenses are associated with one user ID as follows.

User aaaa: α function, Ver 2
: β function, Ver 2
User bbbb: α function, Ver 2
User cccc: β function, Ver 3
: γ function, Ver 1

The user information update unit 13 executes the following procedure for each user ID of the user information 21. First, the user information update unit 13 determines whether the function name of the tied license information transmitted from the license server 400 is registered to the user ID of the user information 21 (S6). When the function name of the tied license information transmitted from the license server 400 is registered (Yes in S6), it means that the function is already registered in the user information 21. Thus, the user information update unit 13 does nothing (S8).

When the function name of the tied license information transmitted from the license server 400 is not registered (No in S6), it is necessary to register the function for the user ID. Thus, the user information update unit 13 registers the tied license information and the current highest version by associating them with the user ID (S7).

For example, since the tied license information is not registered in the user information 21 for the user aaaa and the user bbbb, the user information update unit 13 registers "α function" as tied license information and registers "Ver2" as a specified version by associating them with the user aaaa and the user bbbb respectively. Accordingly, the specified version for the user aaaa and the user bbbb who just purchased the function can be set as the newest version.

Since the β function is already registered as tied license information for the user cccc, the user information update unit 13 does not change the tied license information and the specified version for the user cccc. Accordingly, the specified version of the user cccc can be maintained.

By performing the above-mentioned processing, the tied license information and the specified version can be registered for the user ID in the user information 21 of the image forming apparatus 100.

[Change of Specified Version]

Figure 13:
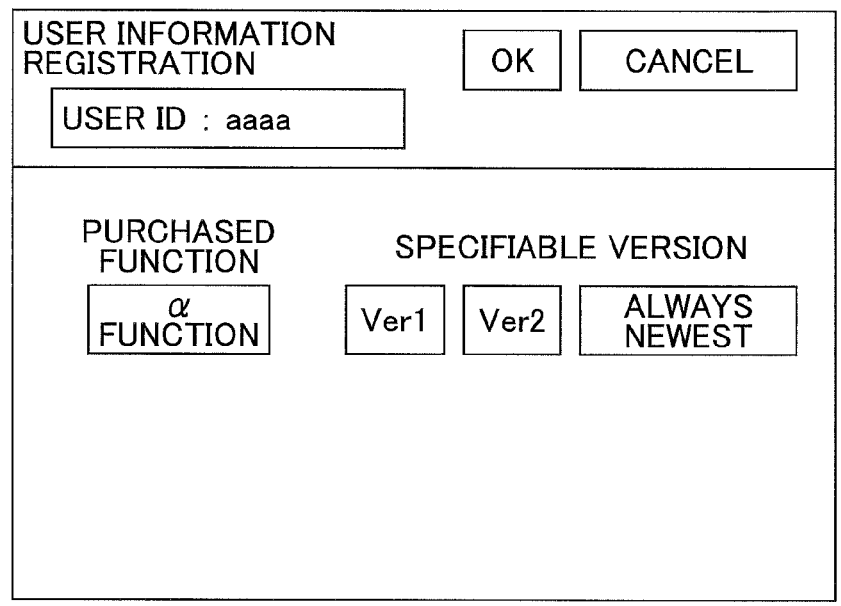
FIG. 13 is an example of a version specifying screen displayed on the operation panel 125 when a user changes a specified version of the user information 21.

FIG. 13 shows an example of a version specifying screen displayed on the operation panel 125 when a user changes a specified version of the user information 21. When the user wants to change a specified version that has already been set, the user operates the operation panel 125 of the image forming apparatus 100 to display an initial setting screen, for example. Then, the user selects change of the user information 21 from among items displayed on the initial setting screen, so that the version specifying screen shown in FIG. 13 is displayed. Also, the user information update unit 13 can process change of password via a similar screen.

Since the user has logged into the image forming apparatus 100, the user name [aaaa] is displayed as the user ID on the version specifying screen shown in FIG. 13. Also, the version specifying screen displays "Purchased function" and "specifiable version" indicating versions that can be specified by the user for the function. In order to display the version specifying screen, the user information update unit 13 reads all function names associated with the user ID as tied license information from the use information 21. Also, the user information update unit 13 sends each function name to the license server 400 to inquire about usable versions. Accordingly, usable versions are displayed for each function. The user can select a desired version from the usable versions.

Also, the user information update unit 13 displays a choice of "always newest" as the specifiable version. The user may select the "always newest" when the user wishes to use a newest version of the function instead of any other version. The item selected by the user is highlighted. When the "OK" button is pushed down, the user information update unit 13 receives the item as a specified version.

The user information update unit 13 registers version information selected from the usable versions as the "specified version" of the user information 21.

[Automatic Introduction of Function]

Even though the specified version the user desires is registered in the user information 21, there may be a case where the specified version of the function is not introduced in the image forming apparatus 100 into which the user logged. Therefore, the image forming apparatus 100 automatically introduces the function according to the login user.

Figure 14:
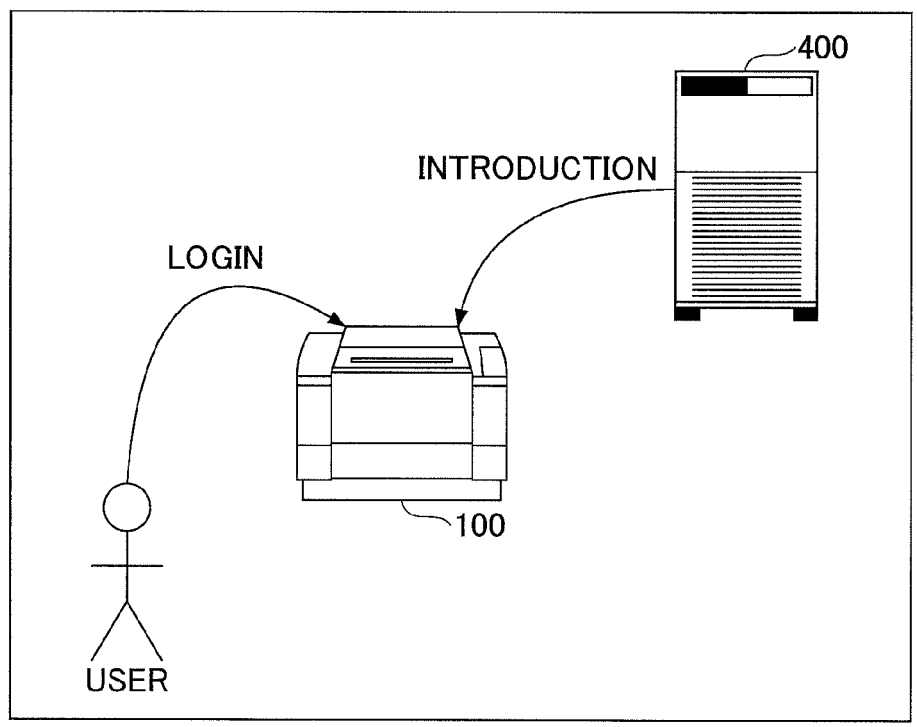
FIG. 14 is an example of a diagram for schematically explaining automatic introduction of a function.
Figure 15:
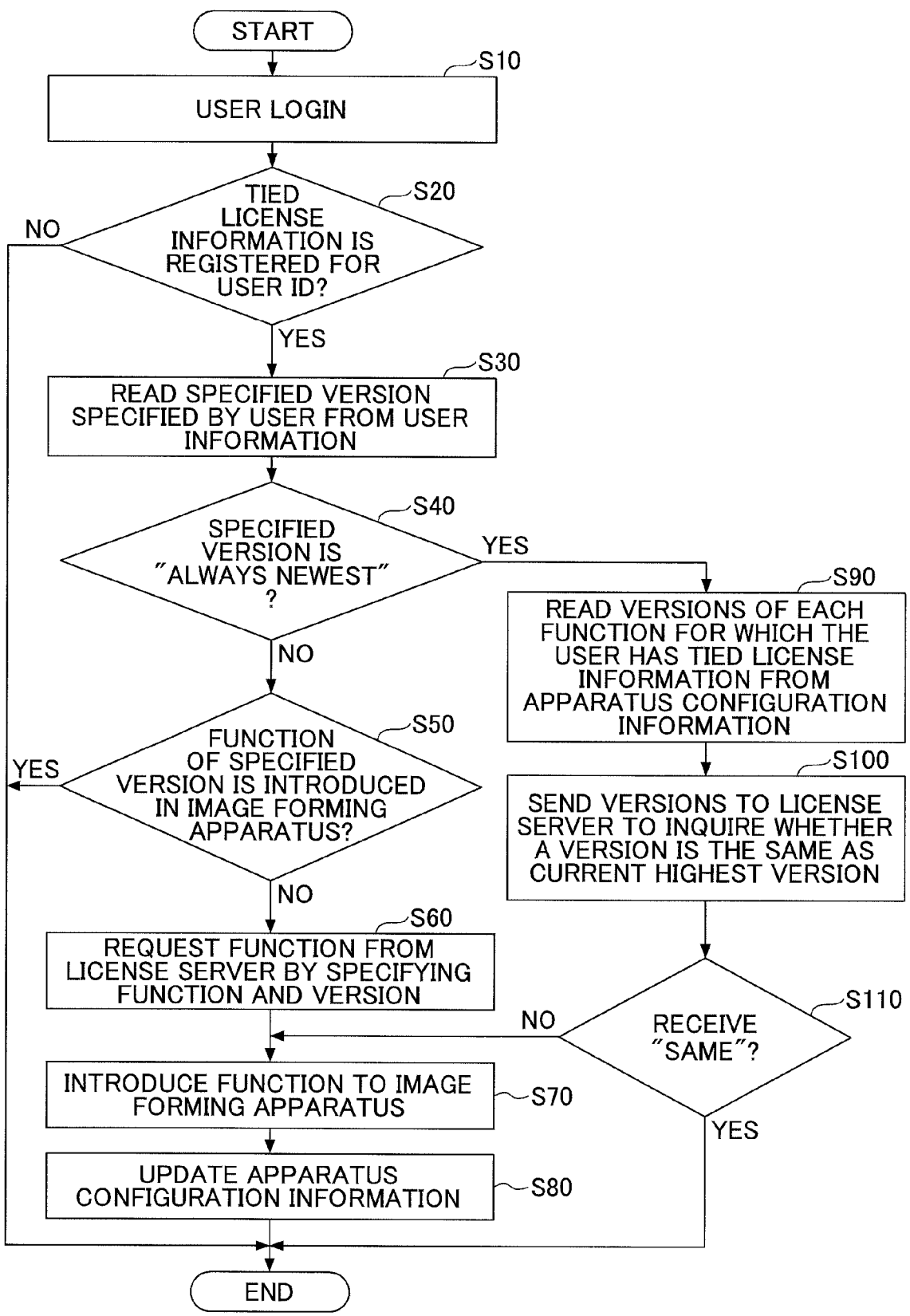
FIG. 15 is an example of a flowchart for explaining a procedure for automatic introduction.

FIG. 14 is an example of a figure for schematically explaining automatic introduction of a function. FIG. 15 is an example of a flowchart for explaining a procedure for automatic introduction.

First, the user logs into the image forming apparatus 100 (S10). The function introduction unit 12 refers to the user information 21, and determines whether tied license information is registered for the user ID of the user who logs in (S20). When the tied license information is not registered (No in S20), the procedure of FIG. 15 ends since it is not necessary to automatically introduce a function.

When the tied license information is registered (Yes in S20), the function introduction unit 12 reads a specified version specified by the user from the user information 21 (S30).

If the specified version is "always newest", it is necessary that the function introduction unit 12 checks if the already-introduced function is one of the current highest version. Therefore, the function introduction unit 12 determines whether the specified version is "always newest" (S40).

When the specified version is not "always newest" (No in S40), the function introduction unit 12 refers to the apparatus configuration information 22 to determine whether the specified version of the function is already introduced in the image forming apparatus 100 (S50).

When the specified version of the function is introduced in the image forming apparatus 100 (Yes in S50), the procedure of FIG. 15 ends since there is no need to introduce the function.

When the specified version of the function is not introduced in the image forming apparatus 100 (No in S50), the function introduction unit 12 specifies the function and the version to the license server 400 in order to request the function (S60). Accordingly, since the specified version of the function is sent from the license server 400, the function introduction unit 12 introduces the function into the image forming apparatus 100 (S70). Accordingly, the user can use the function on the image forming apparatus 100.

Next, the function introduction unit 12 updates the apparatus configuration information 22 (S80). By the update, the function configuration information 22 can be made consistent with functions that are actually included in the image forming apparatus 100.

Returning back to step S40, when the specified version is "always newest" (Yes in S40), the function introduction unit 12 refers to the apparatus configuration information 22 and reads each version of all functions for which the user has tied license information (S90).

Then, the function introduction unit 12 sends versions of all functions to the license server to check if there is a version the same as the current highest version for each function (S100).

When a version of a function introduced in the image forming apparatus 100 is the same as the current highest version, the license server 400 sends information, to the image forming apparatus 100, indicating that there is a version the same as the current highest version for the function. When no version of the function introduced in the image forming apparatus 100 is the same as the current highest version, the license server 400 sends the newest version of the function to the image forming apparatus 100.

The function introduction unit 12 determines whether a response from the license server 400 is for notifying that there is a version the same as the current highest version (S110).

When there is a version the same as the current highest version for a function in the image forming apparatus 100 (Yes in S110), the procedure of FIG. 15 ends for the function since it is not necessary to introduce the function.

When no version of the function introduced in the image forming apparatus 100 is the same as the current highest version (No in S110), the function introduction unit 12 introduces the newest version of the function received from the license server 400 in the image forming apparatus 100. Processes after that are the same as steps S70 and S80.

As mentioned above, the image forming apparatus 100 can automatically introduce a version of function specified by the user.

[Display of Operation Screen (Providing Function)]

In order to provide a version of a function specified by a user to the user, the image forming apparatus 100 displays an icon linked to the version of the function specified by the user on the operation screen. Therefore, the operation screen may change for each user.

Figure 16:
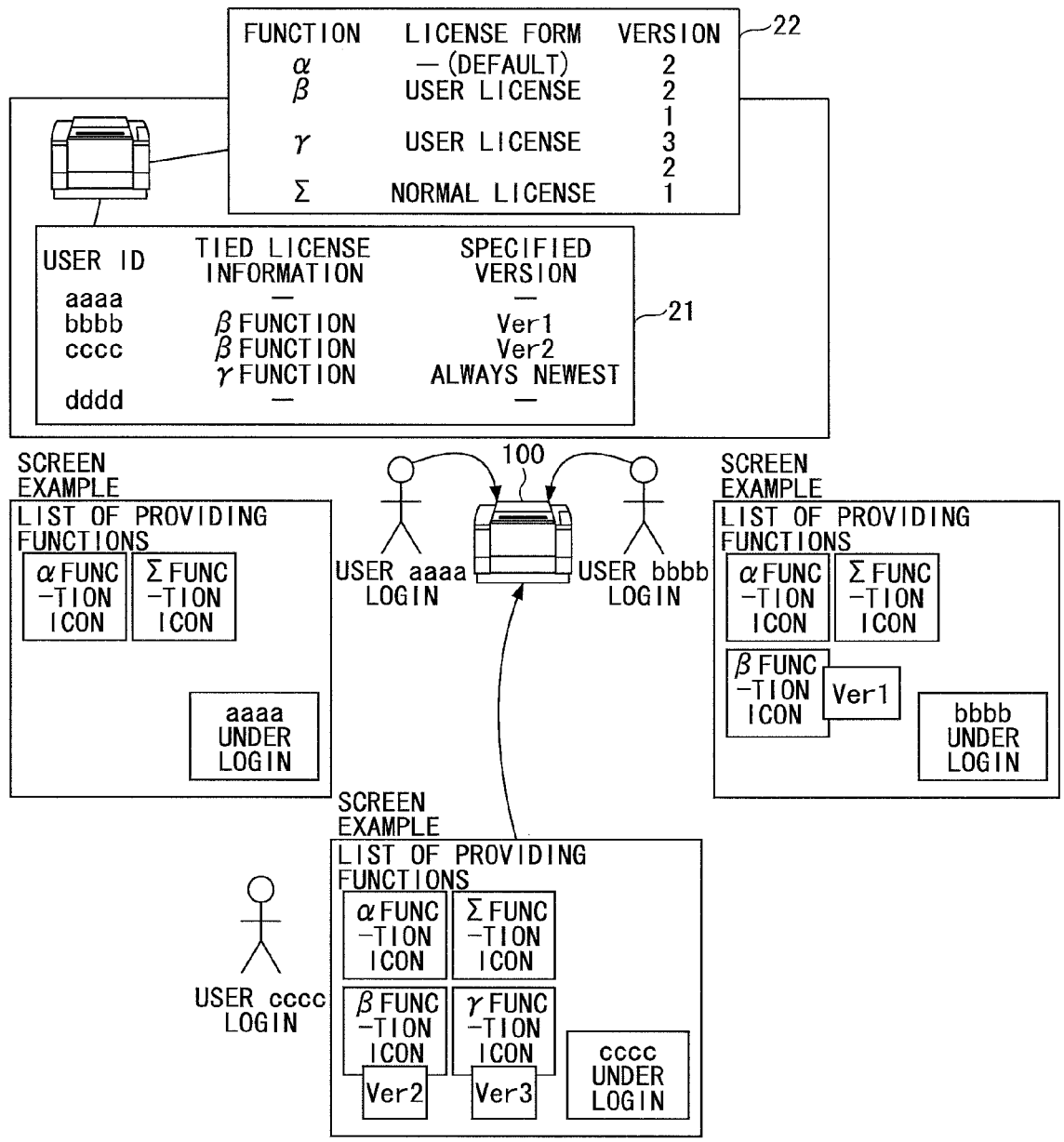
FIG. 16 shows an example of the operation screen that may change for each user.
Figure 17:
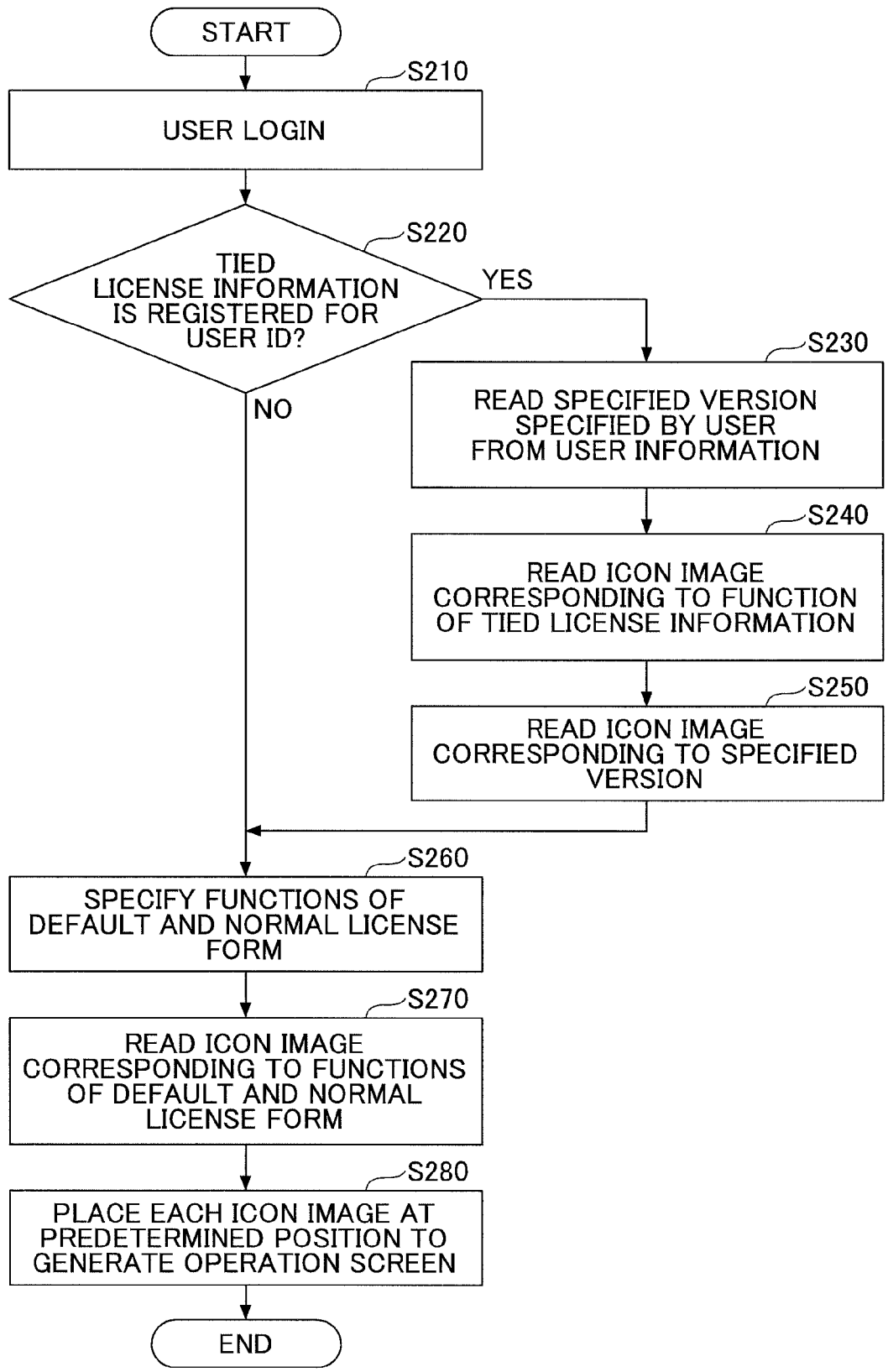
FIG. 17 is an example of a flowchart showing a procedure for generating the operation screen by the screen generation unit 15.

FIG. 16 shows an example of the operation screen that may change for each user. FIG. 17 shows an example of a flowchart showing a procedure for generating the operation screen by the screen generation unit 15.

According to the user information 21 of the image forming apparatus 100 shown in FIG. 16, the user aaaa and the user dddd do not have a function of the tied license form. The user bbbb has a tied license of the β function, and the specified version is Version 1. The user cccc has tied licenses for the β function and the γ function, and specified versions for them are Version 2 and "always newest" respectively.

As shown in the apparatus configuration information 22, the image forming apparatus 100 includes Version 2 and Version 1 of the β function, and Version 3 and Version 2 of the γ function. In the present embodiment, it is assumed that the current highest version of the function γ is Version 3. That is, all versions specified by the users are introduced in the image forming apparatus 100. If they are not introduced, the procedure shown in FIG. 15 is performed.

In such a situation, a user logs into the image forming apparatus 100 (S210). The screen generation unit 15 refers to the user information 21, and determines whether tied license information is registered for the user ID of the login user (S220).

When the tied license information is registered (Yes in S220), the screen generation unit 15 reads each specified version specified by the user from the user information 21 (S230).

Then, the screen generation unit 15 reads icon images corresponding to function names of the tied license information from the parts storage unit 24 in which parts of screens are stored (S240).

Next, the screen generation unit 15 reads icon images corresponding to each specified version specified by the user from the parts storage unit 24 in which parts of screens are stored (S250). By using the icon images, "Ver1", "Wer2", "Ver3" or the like can be shown visually.

Next, returning back to S220, when the tied license information is not registered (No in S220), it is not necessary to provide a version of a function specified by the user. Thus, the screen generation unit 15 specifies functions of the default license form and the normal license form from the apparatus configuration information 22 (S260). These functions are functions selectable from the operation screen by any user.

In addition, the screen generation unit 15 reads icon images corresponding to the functions of default and normal license forms from the parts storage unit 24 in which parts of screen are stored (S270).

Then, the screen generation unit 15 places each icon image at a predetermined position to generate an operation screen (S280).

As shown in FIG. 16, when the user aaaa logs into the image forming apparatus 100, since the user aaaa does not have any function of the tied license form, only "α function icon" of the default function and "Σ function icon" of the normal license function are displayed.

When the user bbbb logs into the image forming apparatus 100, since the user has a tied license of the β function for which the specified version is Version 1, "β function icon" and "Ver1 icon" are displayed. Also, "α function icon" of the default function and "Σ function icon" of the normal license function are displayed.

When the user cccc logs into the image forming apparatus 100, since the user cccc has a tied license of the β function for which the specified version is Version 2, and a tied license of the γ function for which the specified version is "always newest", "β function icon", "Ver2 icon", "γ function icon", and "Ver3 icon" are displayed. Also, "α function icon" of the default function and "Σ function icon" of the normal license function are displayed.

Each of the icons is linked with a corresponding application stored in the function storage unit 23. The launch unit 16 specifies an icon selected by the user based on an operation position on the operation panel 125, and reads the application linked with the icon from the function storage unit 23, and launches the application.

Since the image forming apparatus 100 of the present embodiment displays icons of specified versions of functions specified by a user, the user can launch a desired version of a function from among various versions of the same function.

The image forming apparatus 100 may display icons of all functions introduced in the image forming apparatus 100.

Then, when the user pushes down an icon of a function for which the user does not have a tied license, the image forming apparatus 100 may display a message indicating "this function cannot be used since you do not have a license", for example.

[Automatic Launch (Providing Function) and Automatic Halt of Function]

As mentioned above, the user can select a function of the tied license and launch it by logging into the image forming apparatus. However, as to applications such as gadgets and utility programs, there is a case where operability improves by automatically executing an application without selecting an icon by the user. But, it is not preferable to allow a user other than the login user to use the function.

Considering the above-mentioned matter, it is preferable that the image forming apparatus 100 automatically launches the function in response to login by the user, and that, when the user logs out, the image forming apparatus 100 halts the function of the tied license in response to the logout. By halting the function, even though another user logs into the image forming apparatus 100 next, it becomes possible to prevent the other user from using the tied license function without permission.

When launch of a function is instructed, the OS assigns a memory space and an identifier for file input/output to the function as one process. The OS executes a plurality of processes in parallel by arbitrating resources requested by the processes. Therefore, halt of a function means that the memory space and the file identifiers occupied by the process are released, and that it becomes necessary that the user selects an icon from the operation screen for launching an application again.

Figure 18:
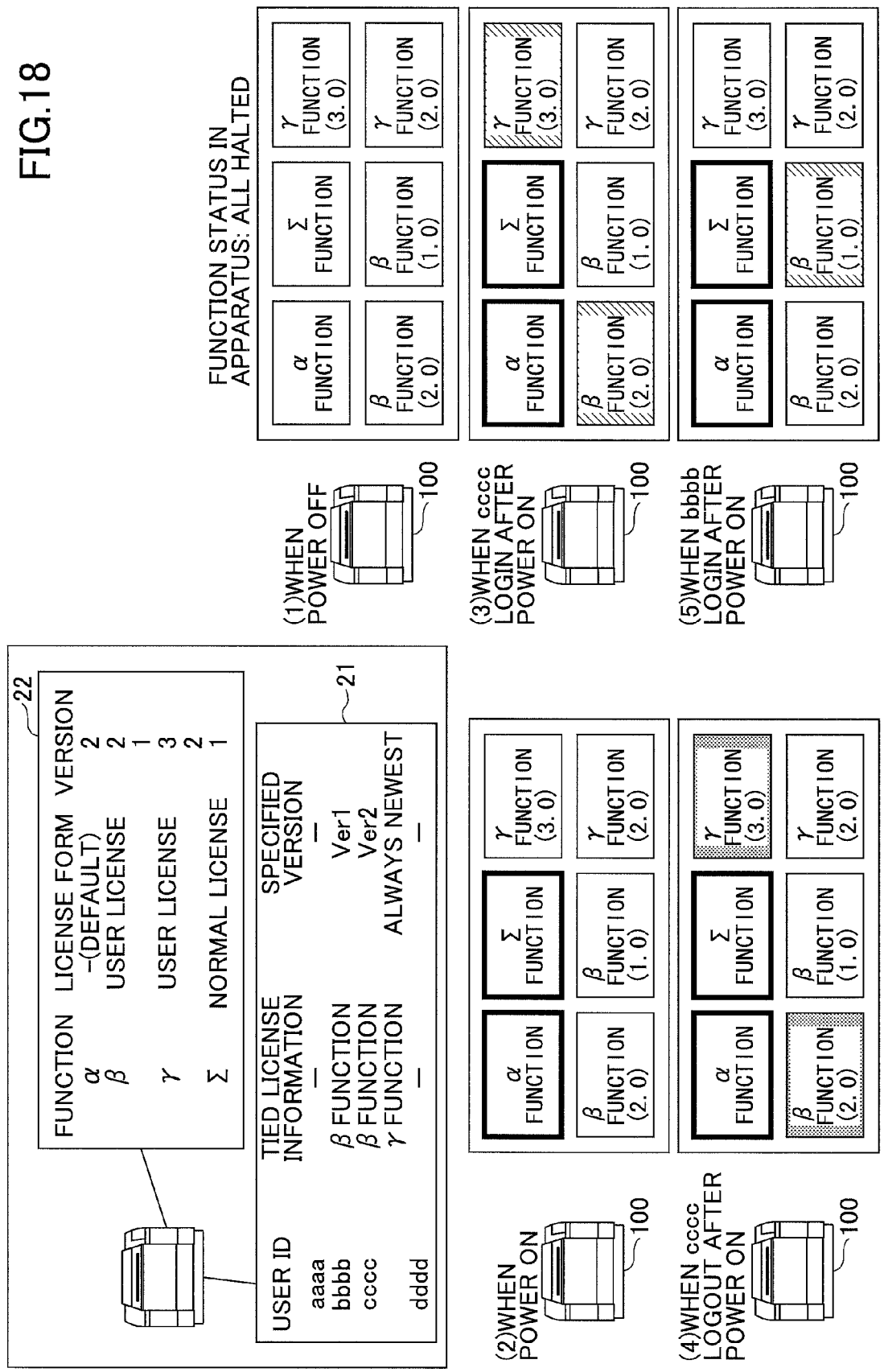
FIG. 18 is an example of a diagram for explaining execution and automatic halt of a function.

FIG. 18 is an example of a figure for explaining execution and automatic halt of a function. The user information 21 and the apparatus configuration information 22 of the image forming apparatus 100 are the same as those of FIG. 16 respectively. The image in the right side of the image forming apparatus 100 shows introduced functions. A function shown as plain color indicates a halted state, a function shown by a thick frame with plain color indicates a function launched when powered on, a function shown by hatched line indicates a function launched by login, and a function shown by being shaded indicates a function halted due to logout.

(1) A state in which the power of the image forming apparatus 100 is OFF

All of the functions introduced in the image forming apparatus 100 (α function, Σ function, Ver3 of γ function, Ver2 of β function, Ver1 of β function, and Ver2 of γ function) are halted.

(2) A state in which the power of the image forming apparatus 100 is ON

The α function and the Σ function that correspond to the default license form and the normal license form are launched.

(3) A state in which the user cccc has logged into the image forming apparatus 100

In addition to the α function and the Σ function, Version 3 of the γ function and Version 2 of the β function that are functions of tied license of the user cccc are launched.

(4) A state in which the user cccc has logged out of the image forming apparatus 100

Version 3 of the γ function and Version 2 of the β function that are functions of tied license of the user cccc are halted, and only the α function and the Σ function are launched.

(5) A state in which the user bbbb logs into the image forming apparatus 100

In addition to the α function and the Σ function, Version 1 of the β function that is a function of tied license of the user bbbb is launched.

Figure 19:
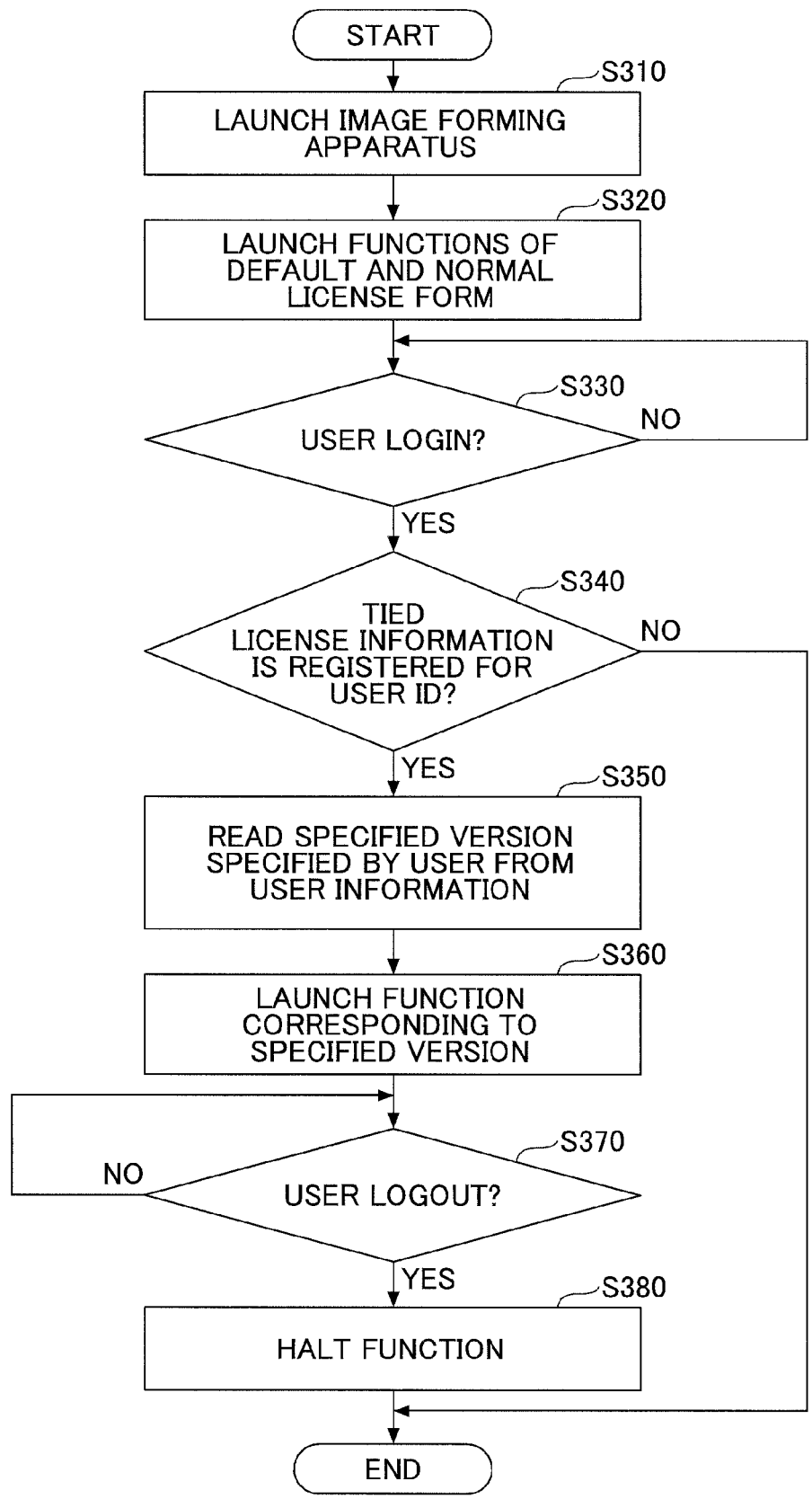
FIG. 19 is an example of a flowchart for explaining a procedure in which the launch unit 16 automatically executes a function and the function halt unit 17 automatically halts the function.

FIG. 19 is an example of a flowchart for explaining a procedure in which the launch unit 16 automatically executes a function and the function halt unit 17 automatically halts the function.

First, the image forming apparatus 100 is powered on so that the image forming apparatus 100 starts (S310). For example, the OS launches the launch unit 16 right after the start of the image forming apparatus 100, so that the launch unit 16 is executed right after the launch of the image forming apparatus 100.

The launch unit 16 launches functions corresponding to the default license form and the normal license form (S320). More particularly, the launch unit 16 reads the apparatus configuration information 22, specifies functions of the default and the normal license forms, reads the functions from the function storage unit 23, and executes the functions using RAM as a working memory. Accordingly, these functions are registered in the OS as processes.

The launch unit 16 monitors whether a user logs into the image forming apparatus 100 (S330). When the user logs in, the launch unit 16 refers to the use information 21 to determine whether tied license information is registered for the user ID (S340).

When the tied license information is not registered for the user ID (No in S340), the launch unit 16 does not launch the function automatically.

When the tied license information is registered for the user ID (Yes in S340), the launch unit 16 reads the function name and the specified version corresponding to the tied license information from the user information 21 (S350).

Then, the launch unit 16 launches the specified version of the function (S360). More specifically, the launch unit 16 reads the specified version of the function from the function storage unit 23 and executes the function using the RAM as a working memory. Accordingly, these functions are registered in the OS as processes.

Next, the function halt unit 17 determines whether the user logs out of the image forming apparatus 100 (S370). The logout by the user is detected when the user pushes down a logout button, for example.

When the user logs out of the image forming apparatus 100 (Yes in S370), the function halt unit 17 requests the OS to halt the function that were automatically launched as a function of the tied license (S380). The OS deletes the function from among managed processes to release the memory. Accordingly, the function is halted, and it becomes necessary to select an icon or to login again in order to launch the function again by the user.

[Modified Example of Change of Specified Version]

Although FIG. 13 shows an example of a version specifying screen, since it is preferable that there are various specified versions that can be selected by the user, a version specifying screen is described in the following by which more various specified versions can be selected.

FIG. 20A shows an example of a version specifying screen displayed on the operation panel 125 when the user changes the specified version of the user information 21. In FIG. 20A, the same reference symbols are assigned to the same parts in FIG. 13.

As shown in FIG. 20A, in addition to versions as numerical numbers that can be specified by the user for a function and "always newest", buttons of "newest in apparatus", "last launched version" and "version of many users" are added.

The button of "newest in apparatus" is a button for setting the newest version of function to be an execution target in the apparatus when different versions of the same function are introduced in the image forming apparatus 100. For example, in a state in which Version 1 and Version 2 of the α function are introduced in the image forming apparatus 100, when the user has a tied license of the α function, the image forming apparatus 100 provides Version 2 of the function to the user. That is, the user can execute the newest version of a function from among versions of the function introduced in the image forming apparatus 100. Therefore, different from the case of "always newest", the image forming apparatus does not need to receive the newest version of the function, so that waiting time for the user can be decreased.

"Last launched version" is a button for setting a version of a function launched last by the image forming apparatus 100 to be an execution target. For enabling the button, the launch unit 16 registers the last launch date and time in the apparatus configuration information 22, for example.

FIG. 21 shows an example of the apparatus configuration information 22. For example, in a state in which Version 1 and Version 2 of the β function are introduced in the image forming apparatus 100, it is assumed that the user has a tied license of the β function. Since the last launch time of Version 1 of the α function is Jan. 1, 2010 and the last launch time of Version 2 of the α function is May 1, 2010, the image forming apparatus 100 provides Version 2 of the function to the user.

The above-mentioned setting is suitable for a user who thinks that the last launched version is highly reliable.

"Version of many users" is a button for setting a version that is most commonly specified as a specified version to be an execution target in the user information 21. The version that is most commonly specified as a specified version is identified from the user information 21. The image forming apparatus 100 refers to the user information 21, and counts the number of users for each function and for each specified version, in which "always newest", "newest in apparatus", "last launched version" and "version of many users" are not counted.

For example, when the number of users specifying Version 1 of the β function as a specified version is 10 and the number of users specifying Version 2 of the β function as a specified version is 20, the image forming apparatus 100 provides a user who selects "version of many users" with Version 2 of the function.

The above-mentioned setting is suitable for users who think that a version specified by many users is highly reliable.

Also, it can be considered that a user does not set a specified version from the version specifying screen shown in FIG. 20A. Therefore, a default specifying form is set for such a case in which a user does not specify a specified version. The setting of the default can be changed by a manager, for example.

FIG. 20B shows an example of a screen displayed on the operation panel 125 when the manager changes the default setting of the specified version. Although the screen of FIG. 20B is almost the same as one shown in FIG. 20A, "default setting common to functions" is displayed instead of "purchased function". Accordingly, the manager can make setting for a default specified version of each function at one time. The setting may be performed for each function.

<Generation of Operation Screen>

Figure 22:
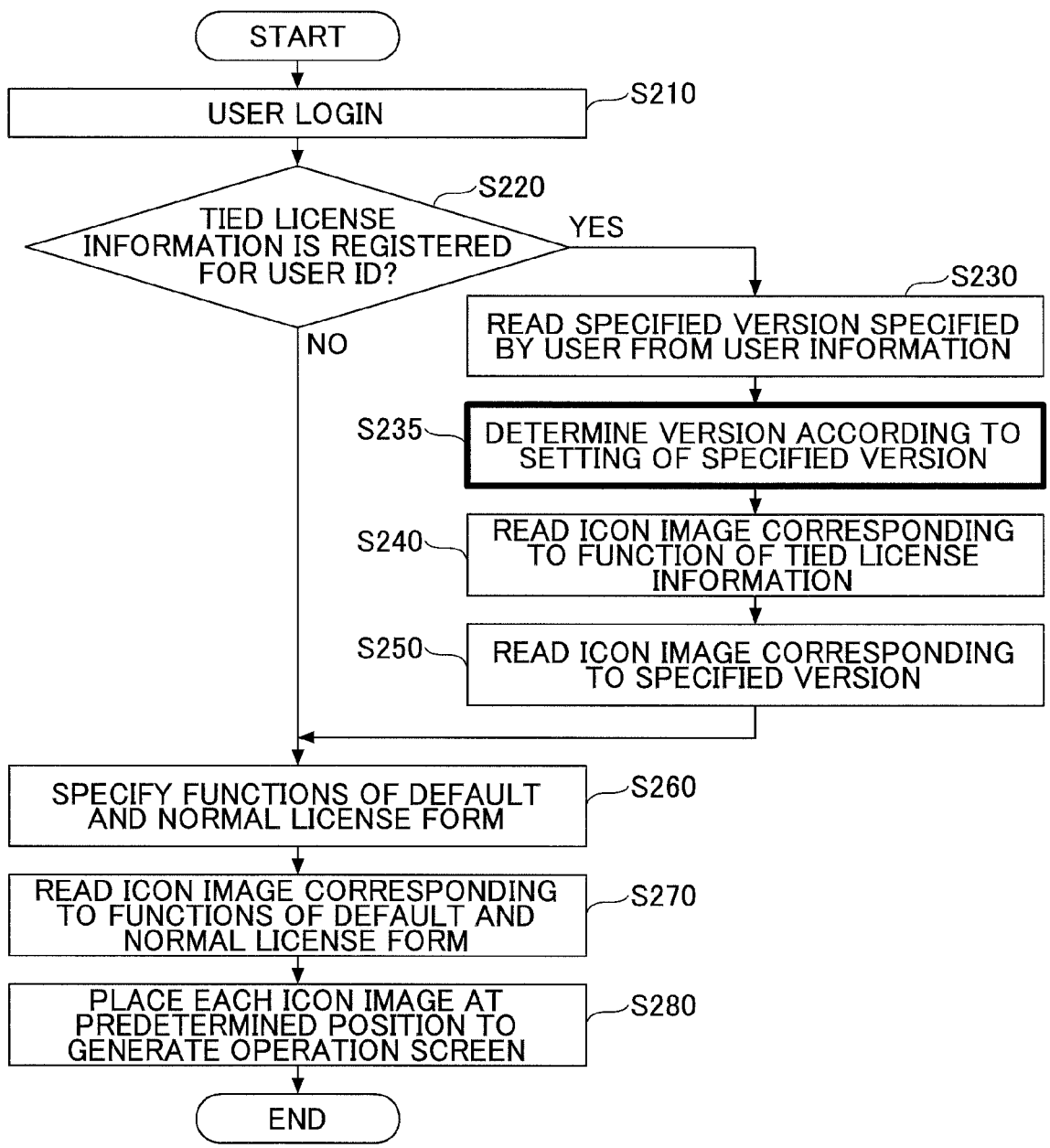
FIG. 22 is an example of a flowchart showing a procedure for generating an operation screen by the screen generation unit 15.

FIG. 22 shows an example of a flowchart showing a procedure for generating an operation screen by the screen generation unit 15 when various versions can be specified as shown in FIGS. 20A and 20B. FIG. 22 is different from FIG. 17 in a step after the screen generation unit 15 reads a specified version specified by the user from the user information 21 in step S230.

In the version specifying screen shown in FIG. 22, any one of a number of specifying a version, "always newest", "newest in apparatus", "last launched version" and "version of many users" is selected as a specified version. In the case of "always newest", the newest version of the function is introduced in the image forming apparatus 100 by execution of the processing shown in FIG. 15. Thus, "always newest" can be regarded to be the same as "newest in apparatus".

Therefore, the screen generation unit 15 determines a version to be provided to a user according to the specified version of "newest in apparatus", "last launched version" or "version of many users" (S235). The method for determining the version is as mentioned above.

Processes after that are the same as those shown in FIG. 17. Accordingly, a user can specify a version in various ways, so that the image forming apparatus 100 can display an icon of a version of a function determined based on the version specifying method.

<Automatic Launch>

Figure 23:
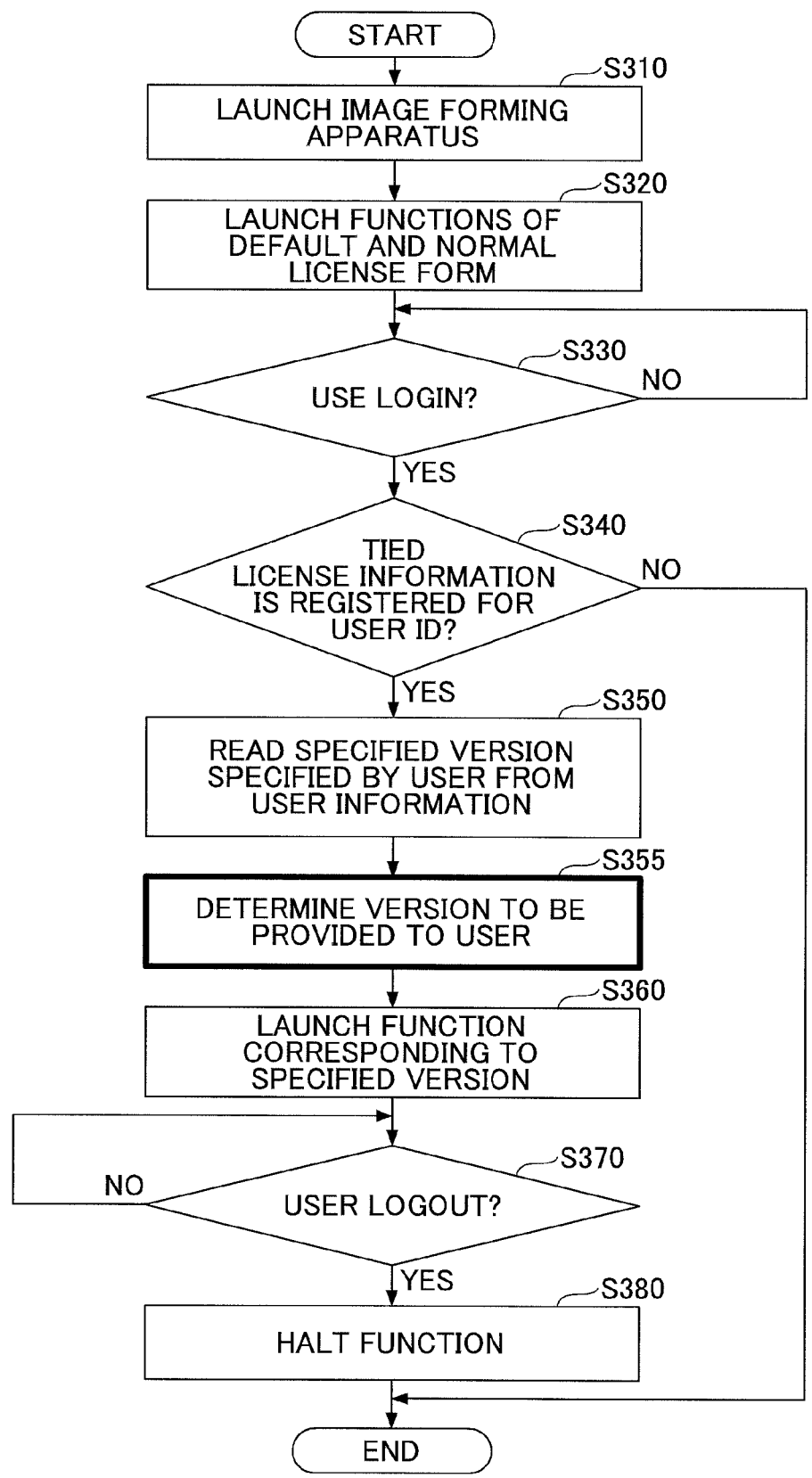
FIG. 23 is an example of a flowchart showing a procedure for automatically launching a function by the launch unit 16.

Also, similar processing is performed for providing a function by automatic launch. FIG. 23 shows an example of a flowchart showing a procedure for automatically launching a function by the launch unit 16 in the case when various version specification is available as shown in FIGS. 20A and 20B.

FIG. 23 is different from FIG. 19 in a step after the launch unit 16 reads a specified version specified by a user from the user information 21 in step S350.

Similar to the flowchart for generating the operation screen, the launch unit 16 determines a version to be provided to a user according to the specified version of "newest in apparatus", "last launched version" or "version of many users" (S355). The method for determining the version is as mentioned above.

Processes after that are the same as those shown in FIG. 19. Accordingly, a user can specify a version in more various ways, so that the image forming apparatus 100 can automatically launch a version of a function determined based on the version specifying method.

[Change to a Version that is Different from Specified Version]

When a user logs into the image forming apparatus 100, an operation screen is displayed. Then, the user can select an icon linked to a version of a function specified as a specified version. In the automatic launch, the version of the function specified as the specified version can be automatically launched.

However, there may be a case where the version of the function displayed as an icon or the version of the function automatically launched is not necessarily a version the user wants, and the user wants to change the version. Therefore, it is preferable to be able to change a version that is a launch target by a user.

<Generation of Operation Screen>

Figure 24:
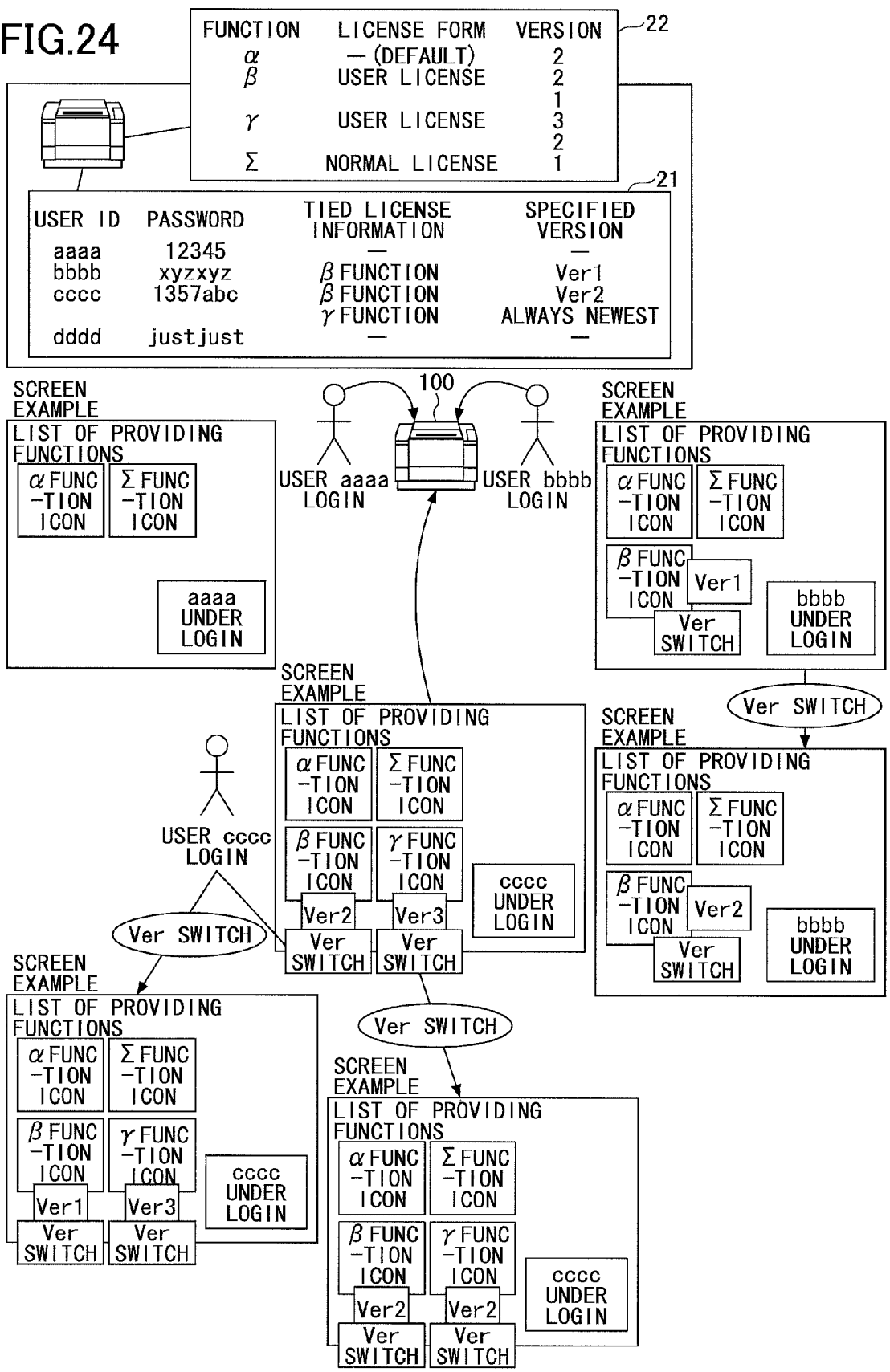
FIG. 24 shows examples of an operation screen that can change for each user.

FIG. 24 shows examples of an operation screen that can change for each user. In FIG. 24, descriptions for parts the same as those shown in FIG. 16 are not provided in the following. In operation screens shown in FIG. 24, an operation screen displayed when the user bbbb logs in and an operation screen displayed when the user cccc logs in are different from corresponding screens shown in FIG. 16.

When the user bbbb logs into the image forming apparatus 100, in addition to "β function icon" and "Ver1 icon", "Ver switch icon" is displayed by being associated with "β function icon", that is, "Ver switch icon" is displayed overlapping with "β function icon". The user bbbb looks at the "Ver1 icon". If the user bbbb thinks that Version 1 is not preferable for a version of the β function, or if the user bbbb wishes to check other versions, the user bbbb pushes down "Ver switch icon".

When the screen generation unit 15 receives the operation, the screen generation unit 15 refers to the apparatus configuration information 22 to specify another version of the β function. Versions are specified in ascending order, for example. As to the β function, since there is Version 2, the screen generation unit 15 specifies Version 2, generates "Ver2 icon", and arranges it on the operation screen by associating the "Ver2 icon" with "β function icon". As shown in the figure, "β function icon", "Ver2 icon" and "ver switch icon" are displayed. The screen generation unit 15 changes the numerical number of "Ver2 icon" and display the changed numerical number each time when push-down of the "Ver switch icon" is detected.

Similar processing is performed for an operation screen when the user cccc logs into the image forming apparatus 100. Since the user cccc has two functions of tied license (β function and γ function), "Ver switch icon" is displayed for each of "β function icon" and "γ function icon". The screen generation unit 15 changes the icon, "Ver2 icon"->"Ver1 icon"->"Ver2 icon", for example, each time when "Ver switch icon" of "β function icon" is pushed down. The screen generation unit 15 changes the icon, "Ver3 icon"->"Ver2 icon"->"Ver3 icon", for example, each time when "Ver switch icon" of "γ function icon" is pushed down.

After pushing down "Ver switch icon", the user pushes down "β function icon" or "γ function icon" for launching a desired function. A version selected at this time is a version selected by the user intentionally. Thus, it is preferable that the selected version is reflected in the specified version. Thus, the specified version change unit 14 sets the version of the function that the user launches to be a specified version in the user information 21. Accordingly, when the user logs into the image forming apparatus 100 next time, it becomes unnecessary for the user to operate the "Ver switch icon". Thus, operability improves.

Figure 25:
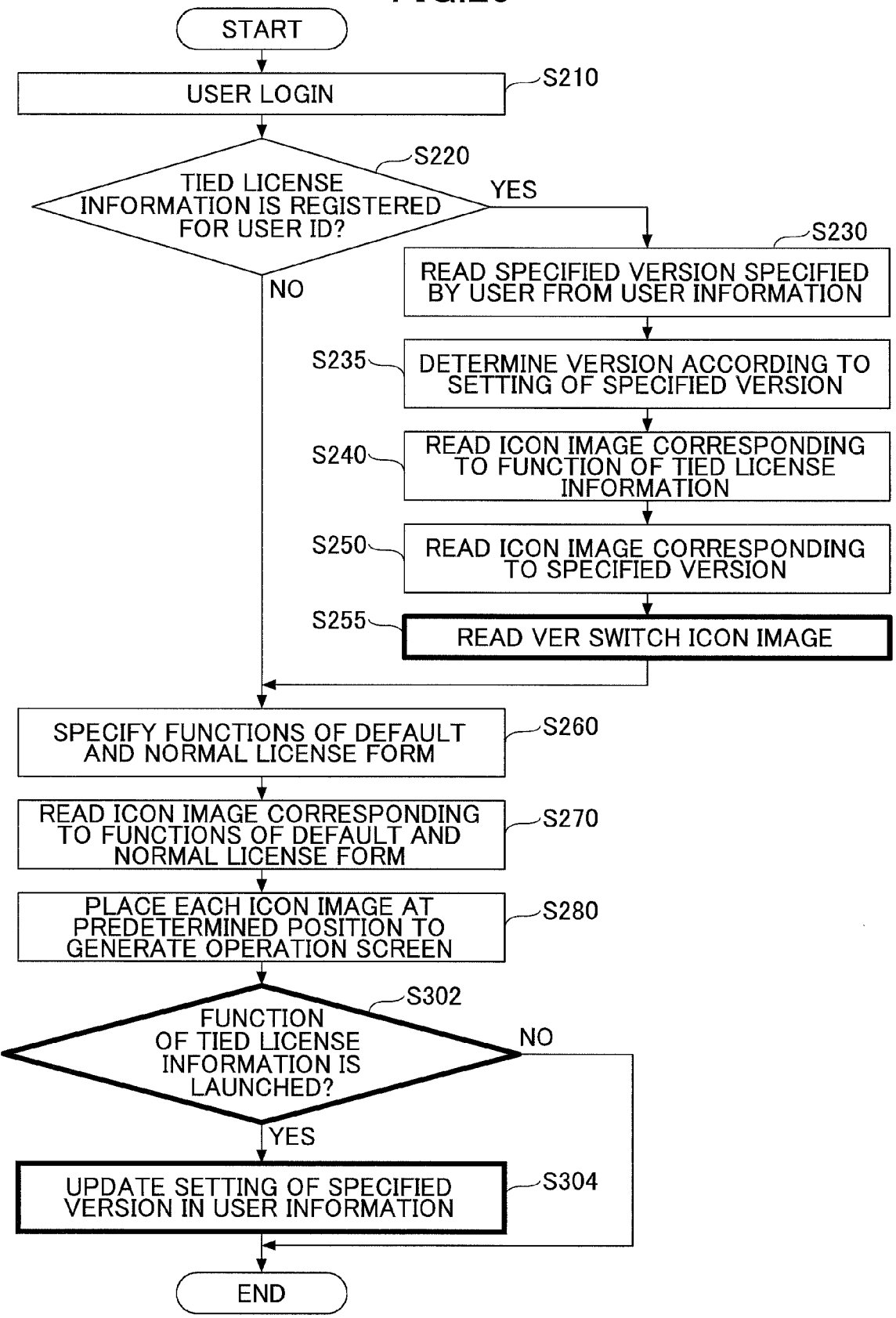
FIG. 25 is an example of a flowchart showing a procedure for generating an operation screen by the screen generation unit 15.

FIG. 25 shows an example of a flowchart showing a procedure for generating an operation screen by the screen generation unit 15. FIG. 25 is different from FIG. 17 in processes after the screen generation unit 15 reads an icon image corresponding to a specified version specified by the user from the parts storage unit 24 storing parts of the screen in step S250.

Next, the screen generation unit 15 reads an icon image of the Ver switch icon from the parts storage unit 24 (S255).

After that, an operation screen shown in FIG. 24 is generated in step S280. Then, the specified version change unit 14 determines whether a function of a tied license is launched from the operation screen (S302). When the function of the tied license is launched (Yes in S302), since there is a possibility that a specified version of the user information 21 needs to be changed, the specified version change unit 14 overwrites the specified version of the user information 21 with the version of the launched function (S304). More specifically, the specified version change unit 14 receives a version "n" for generating a Ver "n" icon (n is an integer) from the screen generation unit 15, specifies the function and the version launched by the launch unit 16, and overwrites the specified version of the user information 21 with the version.

If the specified version is overwritten with the same version, the specified version is not changed as a result. Also, when the specified version of the user information 21 is "always new", "newest in apparatus", "last launched version", or "version of many users", the specified version is replaced with a version that is a numerical value. When the specified version of the user information 21 is "always new", "newest in apparatus", "last launched version", or "version of many users", the specified version change unit 24 may not replace the specified version of the user information 21 even though the function of the tied license information is launched.

<Change to Specified Version by Automatic Launch>

Figure 26:
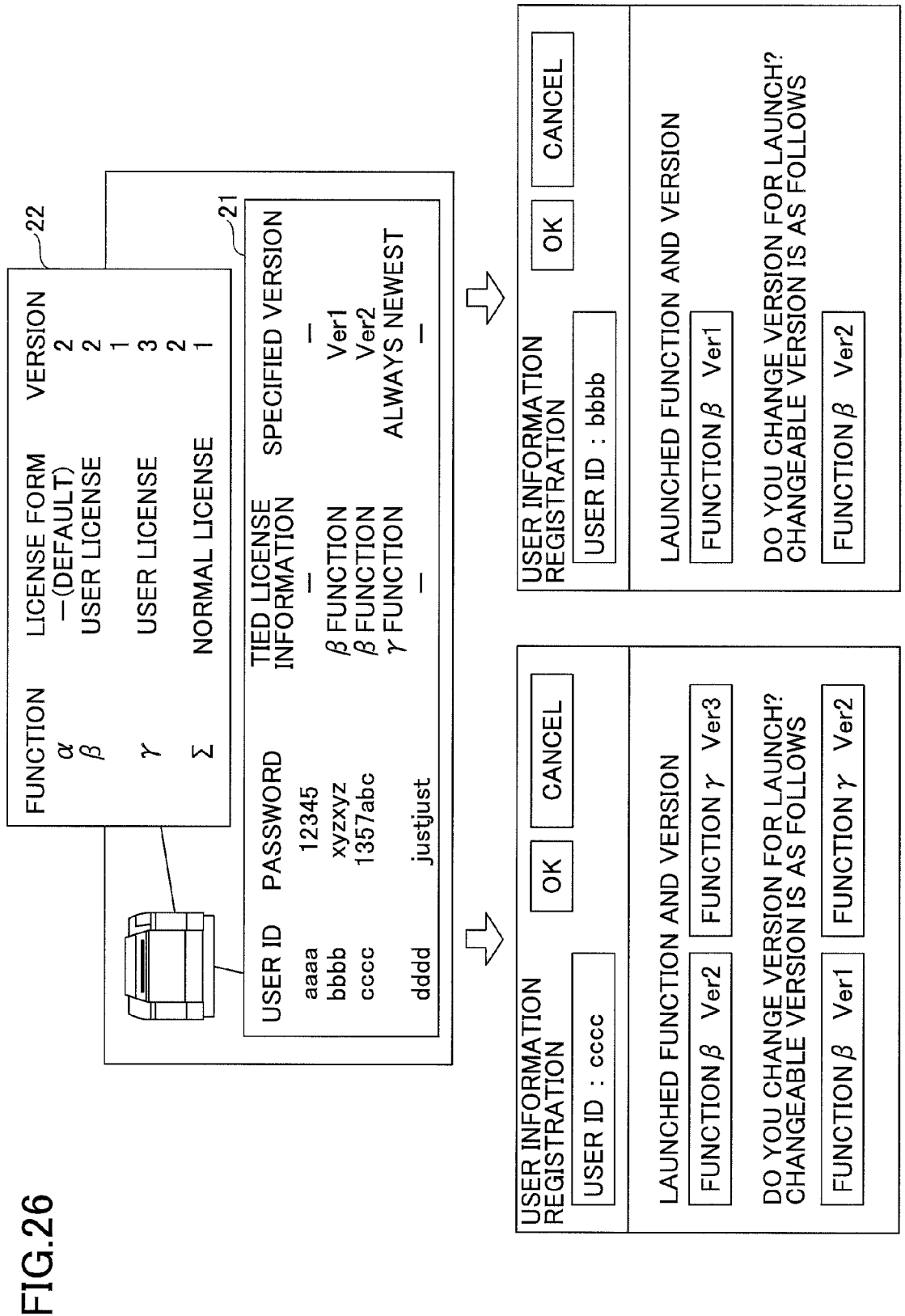
FIG. 26 is an example of a launch version change screen displayed on the operation panel 125 after the launch unit 16 performs automatic launch.

FIG. 26 shows an example of a launch version change screen displayed on the operation panel 125 after the launch unit 16 performs automatic launch.

When the user bbbb logs into the image forming apparatus 100, the launch unit 16 automatically launches the β function for which the user bbbb has a tied license. Therefore, the screen of FIG. 26 shows "β function Ver1" as "launched function and the version". Also, the screen displays "Do you want to change version for launch? Following is changeable version", and displays a "β function Ver2" button. Therefore, if the user thinks that Version 2 is more preferable than Version 1 as the β function, the user pushes down the "β function Ver2" button.

When the function halt unit 17 detects the push-down of the "β function Ver2" button, the function halt unit 17 halts Version 1 of the β function, so that the launch unit 16 automatically launches Version 2 of the β function. Also, the specified version change unit 14 sets the version selected by the user to be a specified version in the user information 21. Accordingly, when the user logs into the image forming apparatus 100 next time, it becomes unnecessary for the user to select another version. Thus, waiting time decreases and operability improves.

FIG. 27 is an example of a flowchart for explaining a procedure for automatically halting a function by the function halt unit 17. FIG. 27 is different from FIG. 19 in steps after the launch unit 16 launches a function corresponding to a specified version in step S360.

The screen generation unit 15 displays a switch button for switching to another version of the tied license function (S362). More specifically, the screen generation unit 15 specifies a version, from the apparatus configuration information 22, other than the version determined according to the setting of the specified version, and displays a switch button by which the user can select the version. If the user does not push down the switch button (No in S364), it is determined whether the user logs out (S370).

When the user pushes down the switch button (Yes in S364), the function halt unit 17 halts the function (S366), and the launch unit 16 launches the function of the version selected using the switch button by the user (S368). More specifically, the launch unit 16 specifies the function and the version based on the pushed switch button, and launches the function. Methods for launch and halt are as mentioned above.

When the user changes a version for launch, it is necessary to change the specified version of the user information 21. Thus, the specified version change unit 14 overwrites the specified version of the user information 21 with the version of the launched function (S369). Processes after that are the same as corresponding steps as shown in FIG. 19.

According to the above-mentioned configuration, not only can the user set a desired version as a specified version, but also the user can change versions of the launch target flexibly. Also, after performing the change of the version, the specified version of the user information 21 can be changed.

[Deletion of Function]

In introduction of functions, if a plurality of versions of a same function are introduced, there is a possibility that the amount of installed data increases and lack of resources may occur. Even though capacity of the HDD 133 increases and the cost decreases, the capacity is finite. Therefore, restrictions set for functions that can be introduced in the image forming apparatus 100 are described. In the following, functions of default and normal licenses are not subjects of deletion.

An upper limit number of functions that can be introduced is set in the image forming apparatus. FIG. 28A shows an example of the apparatus configuration information 22. In this case, the upper limit number of 12 is registered as a sum of functions. This number can be set by a manager from a predetermined screen, for example. In the screen, "introduction date and time" and "use frequency within the past year" are described later.

Although functions more than the upper limit number of functions cannot be introduced in the image forming apparatus 100, an already-introduced function is deleted for avoiding inconvenience that a user cannot introduce a desired function. As for the function to be deleted, it is preferable to select any one of a plurality of versions of functions the same as the function which is an introduction subject. Accordingly, a state can be maintained in which at least one version of each function is introduced. The function delete unit 18 performs the deletion of a function already introduced.

The function delete unit 18 determines a function to be deleted according to any one of the following rules (logics).

Figure 29:
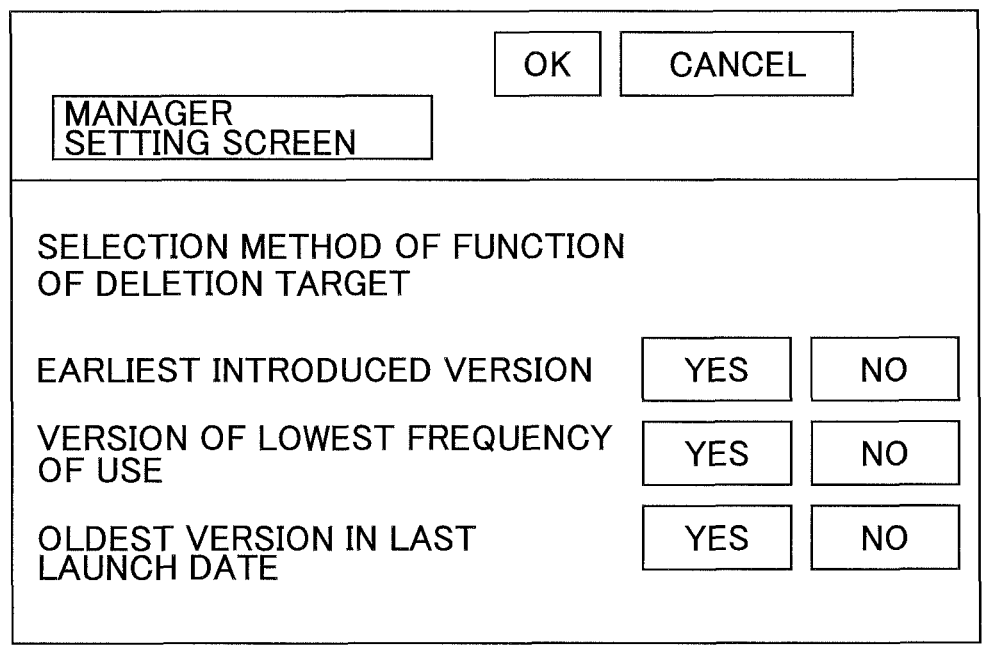
FIG. 29 shows an example of a selection screen of deletion logics.

(a) A version introduced at the earliest time (that is, the oldest version) in a plurality of versions of a same function (b) A version of the lowest use frequency in a plurality of versions of a same function (C) A version for which the last launched date (time) is the oldest in a plurality of versions of a same function The manager can select a desired logic from among the three logics of (a)-(c). FIG. 29 shows an example of a selection screen of deletion logics. The manager performs a predetermined authentication operation so that the operation panel 125 displays the selection screen. On the selection screen, "Yes" button and "No" button are displayed for each of (a)-(c). The function delete unit 18 receives a selection by the manager and stores it.

Figure 30:
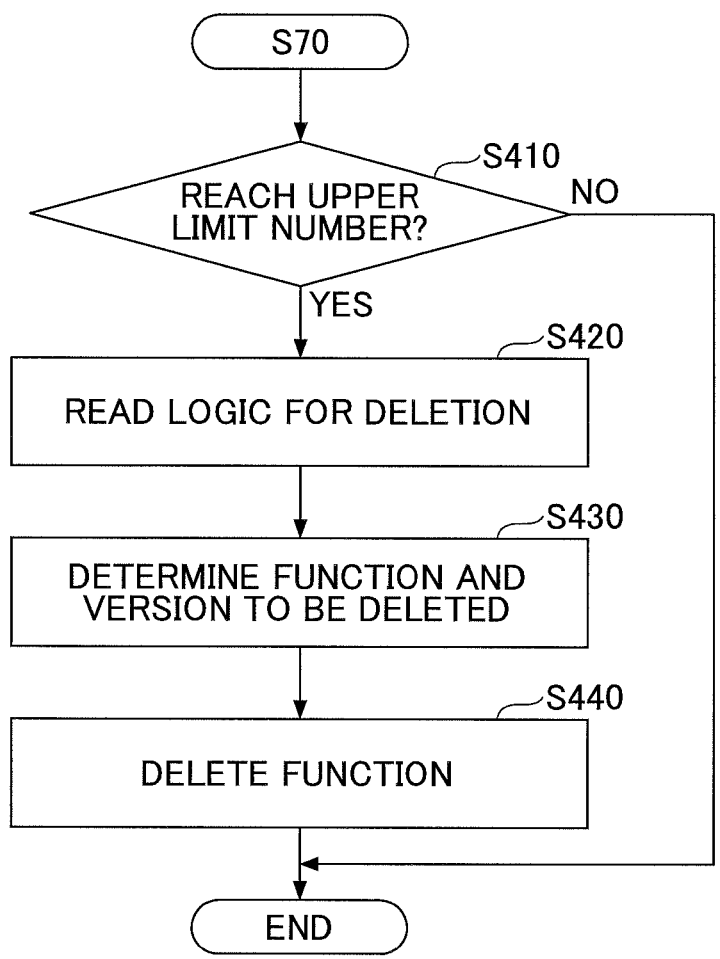
FIG. 30 is an example of a flowchart for explaining a procedure for deleting a function.

FIG. 30 is an example of a flowchart for explaining a procedure for deleting a function. This procedure is executed right before the step S70 in the procedure of "automatic introduction of function" of FIG. 15. Since it is only necessary that the procedure is executed when introducing a function, the procedure may be executed when introducing a function irrespective of automatic introduction or manual introduction.

First, before introducing a function, the function delete unit 18 determines whether the number of introduced functions has reached the upper limit number (S410). The function delete unit 18 counts the number of introduced functions of tied license by referring to the apparatus configuration information 22.

If the number has not reached the upper limit number (No in S410), the procedure of FIG. 30 is not performed since deletion of function is not necessary.

If the number has reached the upper limit number (Yes in S410), the function delete unit 18 reads a deletion logic that is set for deleting a function (S420).

According to the deletion logic, the function delete unit 18 determines a function and a version of the function to be deleted (S430). If (a) was selected as the deletion logic, the function delete unit 18 refers to "introduced date and time" in the apparatus configuration information 22, and specifies a function and a version of the function of the oldest date and time. In the example of FIGS. 28A and 28B, since each of the β function and the γ function has a plurality of versions, the function delete unit 18 specifies a version of a function of the earliest introduction date and time from among versions of the β function and the γ function. As shown in FIGS. 28A and 28B, since Version 1 of the β function is the oldest in introduction date and time, the function delete unit 18 determines Version 1 of the β function as a deletion target.

If (b) was selected as a deletion logic, the function delete unit 18 refers to "use frequency within the past one year", and specifies a function and a version of the version of the lowest use frequency. In the example of FIGS. 28A and 28B, since each of the 3 function and the γ function has a plurality of versions, the function delete unit 18 specifies a function and a version of the function of the lowest use frequency from among the versions of the β function and the γ function. As shown in FIGS. 28A and 28B, since Version 2 of the γ function is the lowest in use frequency, the function delete unit 18 determines Version 2 of the γ function as a deletion target.

If (c) was selected as a deletion logic, the function delete unit 18 refers to "last launch time" in the apparatus configuration information 22, and specifies a function and a version of the function of the oldest last launch time. In the example of FIGS. 28A and 28B, since each of the β function and the γ function has a plurality of versions, the function delete unit 18 specifies a function and a version of the function of the oldest last launch time from among versions of the β function and the γ function. As shown in FIGS. 28A and 28B, since Version 1 of the β function is the oldest in the last launch time, the function delete unit 18 determines Version 1 of the β function as a deletion target.

Then, the function delete unit 18 deletes the function determined to be a deletion target (S440). Accordingly, a room for introducing a function into the HDD 13 of the image forming apparatus 100 can be generated.

As shown in FIG. 28B, the upper limit number in the apparatus configuration information 22 may be registered for each function. In this case, the function delete unit 18 determines a version to be deleted using a logic of (a)-(c) from among a plurality of versions of an already-introduced function the same as a function that is an introduction target.

[Move of Function]

In the function deletion described with reference to FIG. 30, a deleted function may be moved to other apparatuses connected to a network 500. By moving the function, a user at an image forming apparatus 100 placed at a move destination can use the function without introducing the function by the user.

On the other hand, a user may not want to move a function. Therefore, a user can set information indicating whether to move a deleted function in the image forming apparatus 100.

Figure 31:
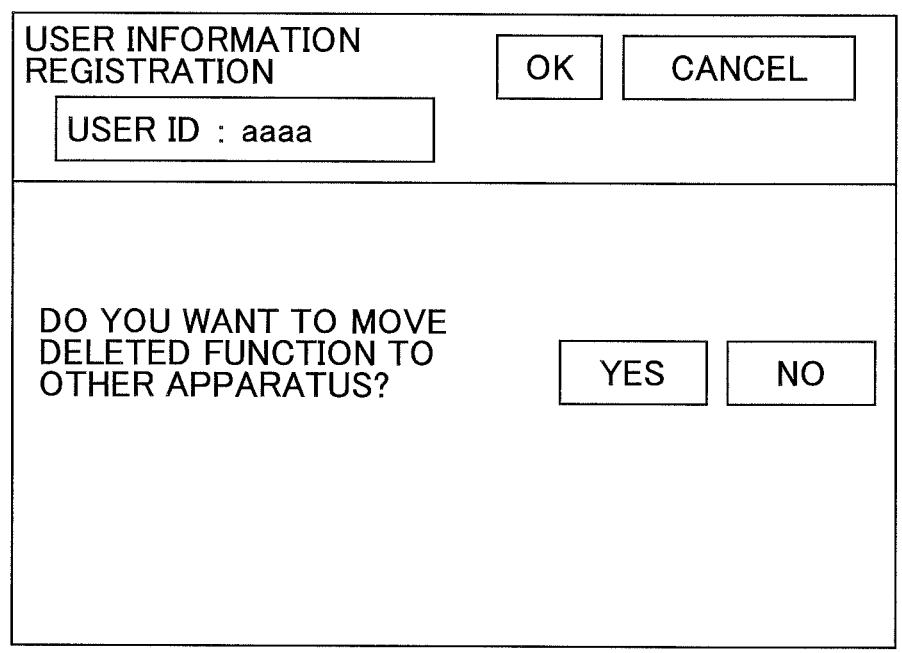
FIG. 31 shows an example of a setting screen for setting whether to move a function.

FIG. 31 shows an example of a setting screen for setting whether to move a function. Also, this screen is displayed by selecting an item indicating change of the user information 21 from among items displayed on the initial setting screen, for example. In FIG. 31, "Do you want to move a deleted function?" is displayed, and a "Yes" button and a "No" button are displayed. When the user pushes down the "Yes" button, the function delete unit 18 starts to move a function when the function is deleted.

FIG. 32 is an example of a flowchart showing a procedure in which the function move unit 19 determines an image forming apparatus 100 of a move destination. This procedure is executed right before step S440 of FIG. 30, in which it is assumed that the function to be deleted remains in the function storage unit 23.

First, the function move unit 19 determines whether the setting for moving a function has been made (S510). When the setting has not been made (No in S520), the process of FIG. 32 ends since it is not necessary to determine a move destination.

It is preferable that an image forming apparatus 100 of the move destination of the function is an image forming apparatus 100 that users frequently use. Thus, when a plurality of image forming apparatuses 100 are connected to the network 500, the function delete unit 18 specifies an image forming apparatus 100 into which users frequently log. Each image forming apparatus 100 stores a history of users who logged into the image forming apparatus 100 as a log. Thus, the use frequency of users can be ascertained based on the log information for a certain past period.

The function delete unit 18 reads all user IDs having the deleted version of the function as a specified version from the user information 21, and broadcasts the user IDs to image forming apparatuses 200 (S530).

Each image forming apparatus 200 that received the user IDs adds up the number of times of past login of users of the user IDs (or, for each user ID), and transmits the total number to the image forming apparatus 100.

The function move unit 19 obtains the total number of past logins of users for a predetermined past period from each image forming apparatus 200 (S540).

The function move unit 19 of the image forming apparatus 100 determines an image forming apparatus 200 corresponding to the largest total number as the move destination (S550).

Then, the function move unit 19 transmits the function that is a delete target to the image forming apparatus 200 determined to be the move destination (S560). Accordingly, the function can be moved to the image forming apparatus 200 that users frequently use.

Accordingly, the image forming apparatus 100 can not only delete a function but also move the function according to the setting of the user.

As mentioned above, according to the image forming apparatus of the present embodiment, different versions of a same function are introduced in one apparatus, so that a version of the function that a user prefers can be provided for the user. Especially, in the case where a plurality of users share a same image forming apparatus, each user can use a preferable version of a function.

The present invention is not limited to these embodiments, but various variations and modifications may be made without departing from the scope of the present invention.

What is claimed is:

1. An image forming apparatus comprising:
a login unit configured to receive a login of a user;
a program storage unit configured to store programs;
a function introduction unit configured to obtain a first program licensed to the user and license information of the first program, and to store the first program and the license information in the program storage unit without deleting a second program that is a different version of the first program from the program storage unit, the licensed program being tied to the user and not the apparatus, for use by the user;
a user information storage unit configured to store user information that registers license information of programs introduced by the function introduction unit and version information of the programs with user IDs; and
a function providing unit configured to specify license information and version information that are associated with a user ID of a user who logs into the image forming apparatus in order to provide a function realized by a program corresponding to the license information and the version information to the user,
wherein a specification of the version information from among versions of a same program is registered with the user ID, and
wherein the function introduction unit induces, via an external source, the program corresponding to the specification of the version information registered with the user ID into the image forming apparatus when the program corresponding to the specification of the version information registered with the user ID is not previously stored on the image forming apparatus.

2. The image forming apparatus as claimed in claim 1, wherein the function providing unit includes a launch unit configured to automatically launch the program of the version information associated with the user ID of the user.

3. The image forming apparatus as claimed in claim 1, wherein the function providing unit includes a screen generation unit configured to generate an operation screen for receiving a launch instruction of the program of the version information associated with the user ID of the user.

4. The image forming apparatus as claimed in claim 1, further comprising a version specification receiving unit configured to receive the specification of version information from among versions of a same program.

5. The image forming apparatus as claimed in claim 4, wherein, when the version specification receiving unit does not receive the specification of the version information from the user,
the function providing unit uses, as the version information, any one of a numerical value of a version specified by the user, a newest version in released versions, a version for which the number of users is the largest, a last launched version, and a newest version in versions introduced in the image forming apparatus which are set initially in the image forming apparatus.

6. The image forming apparatus as claimed in claim 5, further comprising an initial setting receiving unit configured to receive a change instruction for changing version information of initial setting.

7. The image forming apparatus as claimed in claim 2, wherein the launch unit receives an instruction for switching a version of a program automatically launched by the launch unit into a different version of the program and launching the different version of the program.

8. The image forming apparatus as claimed in claim 2, further comprising a function halt unit configured to halt a program automatically launched by the launch unit when the user logs out of the image forming apparatus.

9. The image forming apparatus as claimed in claim 7, further comprising a specified version change unit configured to update the version information associated with the user ID in the user information with the different version when receiving the instruction.

10. The image forming apparatus as claimed in claim 3, wherein the screen generation unit receives an instruction for switching between an icon linked to a version of a program corresponding to version information associated with the user ID of the user and an icon linked to a different version of the program.

11. The image forming apparatus as claimed in claim 10, further comprising a specified version change unit configured to update the version information associated with the user ID of the user with the different version when the screen generation unit receives the instruction for switching between the icons.

12. The image forming apparatus as claimed in claim 1, the function introduction unit including an upper limit number setting receiving unit configured to receive setting of an upper limit number of programs that can be stored in the storage unit.

13. The image forming apparatus as claimed in claim 12, further comprising a function delete unit, wherein, if the number of programs already stored in the storage unit has reached the upper limit number when the function providing unit stores a program in the storage unit, the function delete unit deletes a different version of the program to be stored by the function providing unit from programs stored in the storage unit.

14. The image forming apparatus as claimed in claim 13, further comprising a delete method selection receiving unit configured to receive a selection of a method for determining a program to be deleted, the selection being one of a first method, a second method and a third method, wherein
the first method is to select a version introduced at the earliest time from among a plurality of versions of a same program;
the second method is to select a version of the lowest use frequency from among a plurality of versions of a same program; and
the third method is to select a version for which the last launched time is the oldest from among a plurality of versions of a same program.

15. The image forming apparatus as claimed in claim 12, further comprising a function move unit configured to move a program deleted by the function delete unit to an apparatus connected via a network.

16. The image forming apparatus as claimed in claim 15, wherein the function delete unit specifies user IDs associated with the program to be deleted by the function delete unit from the user information, specifies an apparatus into which users of the user IDs logged most commonly, and moves the program to be deleted by the function delete unit to the specified apparatus.

17. The image forming apparatus as claimed in claim 15, further comprising a move necessity receiving unit configured to receive information indicating whether to move the program deleted by the function delete unit.

18. An equipment system comprising an image forming apparatus and a server for distributing programs and license information,
the server comprising license management information that associates license information with user IDs,
the image forming apparatus comprising:
a login unit configured to receive a login of a user;
a program storage unit configured to store programs;
a function introduction unit configured to obtain a first program licensed to the user and license information of the first program, and to store the first program and the license information in the program storage unit without deleting a second program that is a different version of the first program from the program storage unit; the licensed program being tied to the user and not the apparatus, for use by the user;
a user information storage unit configured to store user information that registers license information of programs introduced by the function introduction unit and version information of the programs with user IDs; and
a function providing unit configured to specify license information and version information that are associated with a user ID of a user who logs into the image forming apparatus in order to provide a function realized by a program corresponding to the license information and the version information to the user.
wherein a specification of the version information from among versions of a same program is registered with the user ID, and
wherein the function introduction unit introduces, via an external source, the program corresponding to the specification of the version information registered with the user ID into the image forming apparatus when the program corresponding to the specification of the version information registered with the user ID is not previously stored on the image forming apparatus.

19. A non-transitory computer-readable storage medium storing a program for causing an image forming apparatus to execute the steps of:
receiving a login of a user;
obtaining a first program licensed to the user and license information of the first program, the licensed program being tied to the user and not the apparatus, for use by the user;
storing the first program and the license information in a program storage unit without deleting a second program that is a different version of the first program from the program storage unit;
storing the license information of the first program and version information of the first program with a user ID of the user in a user information storage unit as user information;
specifying license information and version information that are associated with a user ID of a user who logs into the image forming apparatus in order to provide a function realized by a program corresponding to the license information and the version information to the user,
wherein a specification of the version information from among versions of a same program is registered with the user ID; and
introducing, via an external source, the program corresponding to the specification of the version information registered with the user ID into the image forming apparatus when the program corresponding to the specification of the version information registered with the user ID is not previously stored on the image forming apparatus.

* * * * *